United States Patent
Stanke et al.

(10) Patent No.: US 9,392,438 B2
(45) Date of Patent: Jul. 12, 2016

(54) METHOD AND APPARATUS TO MANAGE USER/DEVICE PROFILES FOR PUBLIC SAFETY APPLICATIONS

(71) Applicant: MOTOROLA SOLUTIONS, INC, Schaumburg, IL (US)

(72) Inventors: Marianne J. Stanke, Elmhurst, IL (US); James A. Marocchi, Winfield, IL (US); Daniel J. Naylor, Inverness, IL (US); Hemang F. Patel, Hoffman Estates, IL (US); Francesca Schuler, Palatine, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 63 days.

(21) Appl. No.: 14/495,236

(22) Filed: Sep. 24, 2014

(65) Prior Publication Data

US 2016/0088463 A1    Mar. 24, 2016

(51) Int. Cl.
| | |
|---|---|
| *H04W 4/00* | (2009.01) |
| *H04W 8/18* | (2009.01) |
| *H04W 4/22* | (2009.01) |
| *H04W 24/00* | (2009.01) |
| *H04W 72/00* | (2009.01) |
| *H04M 3/51* | (2006.01) |
| *H04W 76/00* | (2009.01) |

(52) U.S. Cl.
CPC ............. *H04W 8/18* (2013.01); *H04W 4/22* (2013.01); *H04M 3/5116* (2013.01); *H04W 76/007* (2013.01)

(58) Field of Classification Search
CPC ....... H04M 1/66; H04M 11/04; H04W 24/00; H04W 24/02; H04W 68/00; H04W 48/18; H04W 48/16; H04W 8/18; H04W 28/08; H04W 28/01

USPC .............................................. 455/410, 432.3
See application file for complete search history.

(56) References Cited

U.S. PATENT DOCUMENTS

| | | | |
|---|---|---|---|
| 7,243,105 B2 | 7/2007 | Thint et al. | |
| 7,610,366 B2 | 10/2009 | Wilson, Jr. | |
| 8,140,650 B2 | 3/2012 | Pulkkinen et al. | |
| 8,341,317 B2 | 12/2012 | Staats et al. | |
| 8,417,553 B2 * | 4/2013 | Putra ...................... | G06Q 10/00 705/7.14 |

(Continued)

FOREIGN PATENT DOCUMENTS

| | | |
|---|---|---|
| WO | 0056112 A1 | 9/2000 |
| WO | 2012136261 A1 | 10/2012 |
| WO | 2014012596 A1 | 1/2014 |

OTHER PUBLICATIONS

The PCT Search Report and the Written Opinion, PCT/US2015/048802, filed: Sep. 8, 2015, mailed Dec. 10, 2015, all pages.

*Primary Examiner* — Huy C Ho

(57) ABSTRACT

A method and a profile manager for managing user and device profiles for response to one or more incidents include monitoring inputs related to one or more networks, a plurality of devices, and the one or more incidents; determining application requirements and profile configurations for the plurality of devices based on the inputs from the one or more networks and the one or more incidents; and for each of the plurality of devices, providing applications based on the application requirements if required and providing the profile configurations for operation on the one or more networks during the one or more incidents.

19 Claims, 16 Drawing Sheets

(56) References Cited

U.S. PATENT DOCUMENTS

| | | |
|---|---|---|
| 8,504,809 B2 | 8/2013 | Chien |
| 8,635,287 B1 | 1/2014 | Shih et al. |
| 8,635,661 B2 | 1/2014 | Shahbazi |
| 8,635,678 B2 | 1/2014 | Raleigh |
| 2003/0088651 A1 | 5/2003 | Wilson |
| 2004/0078457 A1 | 4/2004 | Tindal |
| 2005/0021784 A1 | 1/2005 | Prehofer |
| 2005/0202802 A1 | 9/2005 | Pruuden et al. |
| 2006/0178919 A1 | 8/2006 | Warncke |
| 2010/0150122 A1* | 6/2010 | Berger .............. H04W 4/02 370/338 |
| 2010/0319053 A1 | 12/2010 | Gharabally |
| 2011/0131177 A1 | 6/2011 | Sheth et al. |
| 2011/0237287 A1 | 9/2011 | Klein et al. |
| 2012/0143791 A1 | 6/2012 | Sathish |
| 2013/0159476 A1 | 6/2013 | Hilburn et al. |
| 2013/0201922 A1 | 8/2013 | Fredericks et al. |
| 2014/0046645 A1 | 2/2014 | White et al. |
| 2014/0187190 A1 | 7/2014 | Schuler et al. |

\* cited by examiner

METHOD AND APPARATUS TO MANAGE USER/DEVICE PROFILES FOR PUBLIC SAFETY APPLICATIONS

BACKGROUND OF THE INVENTION

Wireless network resources are deployed for public safety applications. First responders and other public safety individuals ("users") can be equipped with a mobile device that is configured to communicate with public safety networks as well as other networks (such as commercial networks, private networks, etc.). There are numerous questions associated with mobile device usage on the public safety networks and/or the commercial networks, private networks, etc. For example, how might a public safety mobile device be homed on a national or regional agency network and roam to another network with minimal hardware impact? How might a public safety mobile device be homed on a national or regional agency network and on another network (dual home device) simultaneously without roaming or without substantial device or network impacts? How device policy might be enabled, and deployed to facilitate changing from, for example, private to non-private bands? For example, device policy scope can include Quality of Service (QoS), security, application usage, device management, etc.

When a mobile device migrates to a different network, or a different agency in the same network, such as when a user is collaborating in a mutual aid or disaster scenario, access to new or updated applications ("apps") may be required. This can include an associated upload and/or configuration of that user's mobile device to use the new applications, new security credentials for those apps (in the back end), or there may be a need to collaborate with a different workgroup or set of individuals, or interoperate with specific Land Mobile Radio (LMR) talk groups, then during normal operations.

Today, a device would require user or administrator-driven provisioning change for a fully interoperable environment. There is a need to do this in a dynamic and automated way. It is envisioned in a national or regional agency environment that there may be three distinct points of control for a device image: national, agency/jurisdictional, and local incident related. In the local case, an incident commander may be making application and configuration choices in real time that he/she wants to distribute to the target responder group instantly without going up the national or agency level governance chain.

Thus, there is a need to correlate profile changes across devices (including bring-your-own-device (BYOD)) and across operating systems (OSs). Today's process is prone to human error, significant delay and complexity when time and reliability are critical for users.

Accordingly, there is a need for a method and apparatus to manage user/device profiles dynamically in public safety applications or the like.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
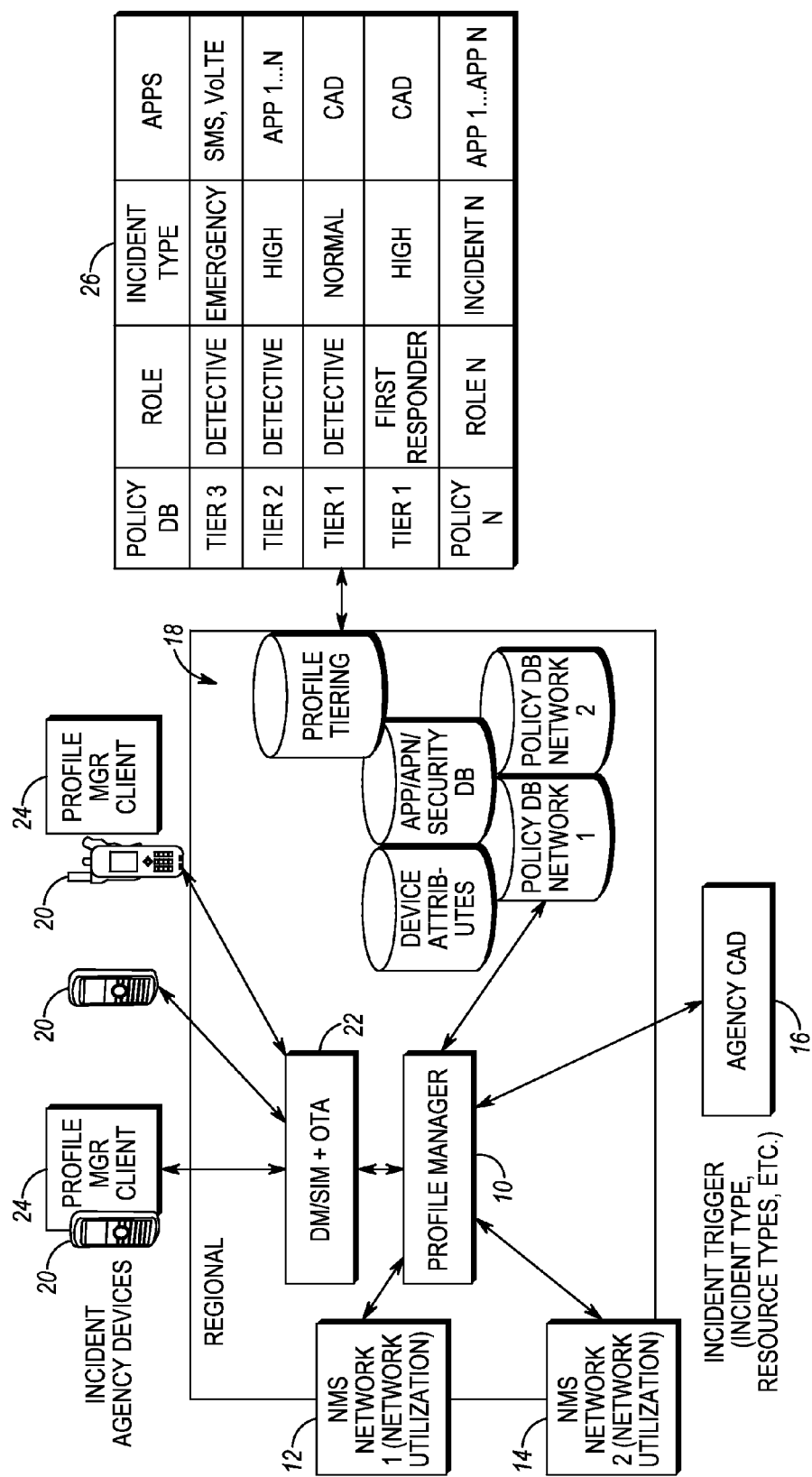
FIG. 1 is a block diagram of a profile manager in accordance with some embodiments.
Figure 2A:
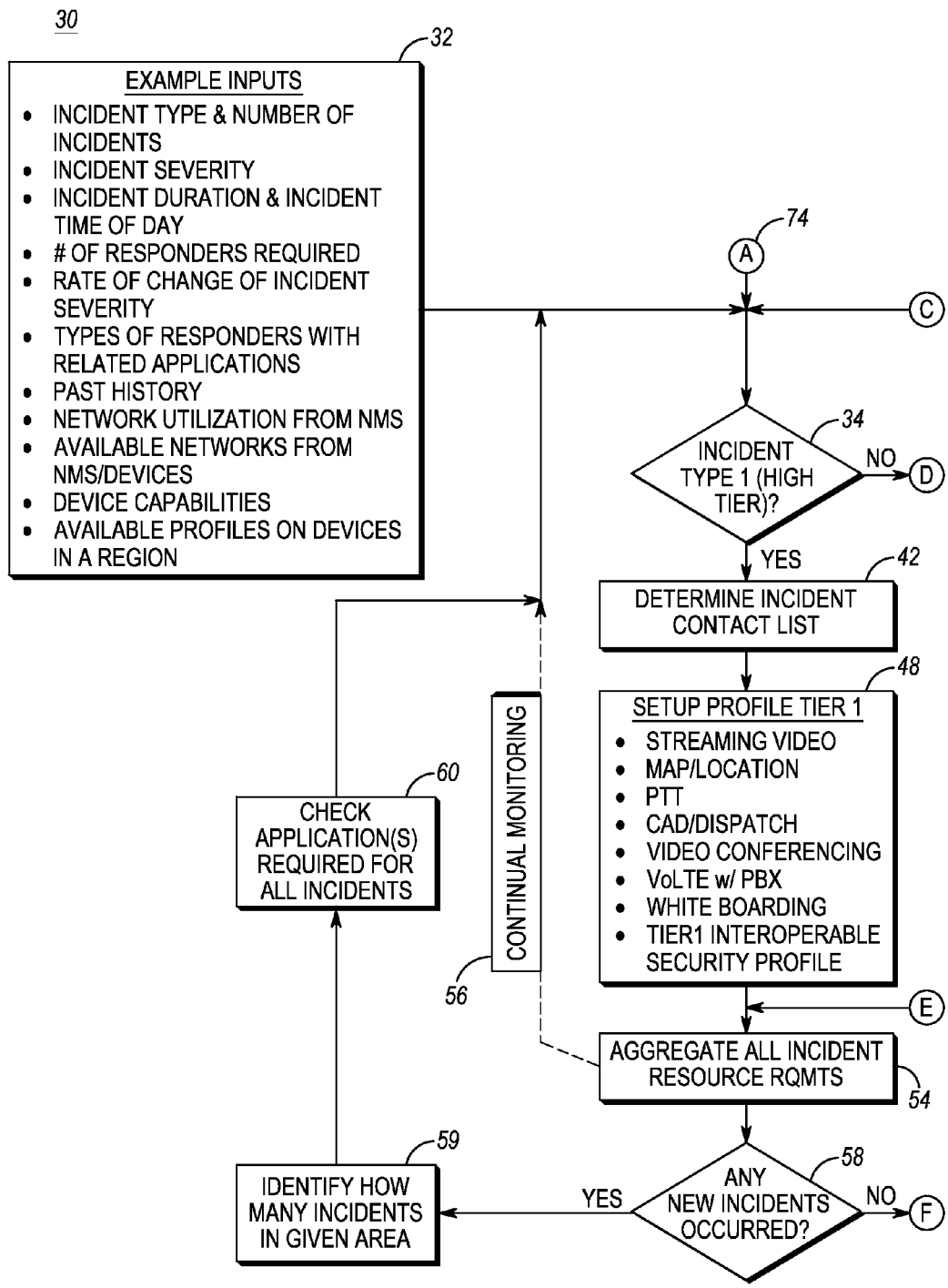
FIGS. 2A-2B are a flowchart of a profile manager process for the profile manager of FIG. 1 in accordance with some embodiments.
Figure 2B:
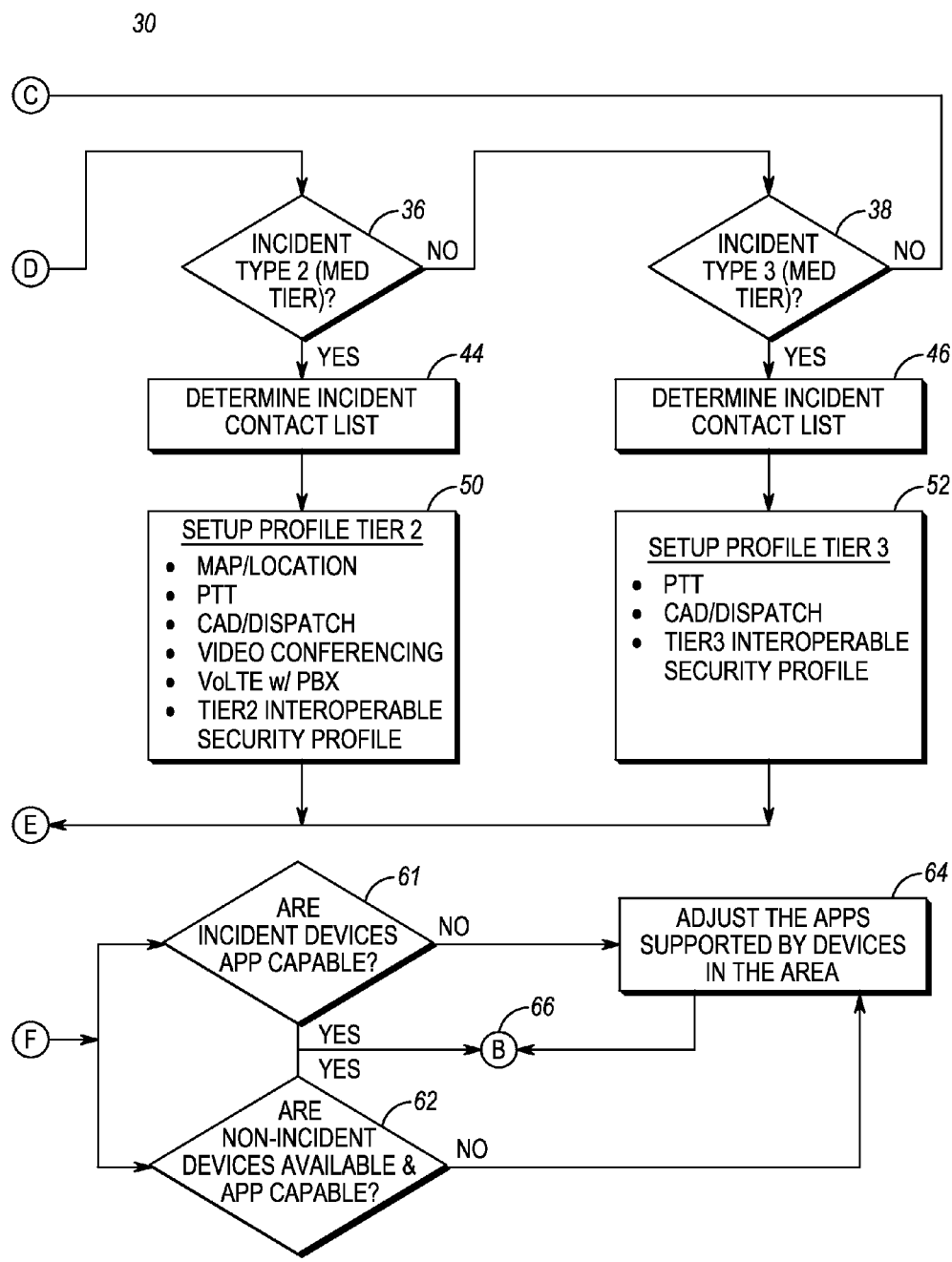

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment, a method for managing user and device profiles for response to one or more incidents includes monitoring inputs related to one or more networks, a plurality of devices, and the one or more incidents; determining application requirements and profile configurations for the plurality of devices based on the inputs from the one or more networks and the one or more incidents; and, for each of the plurality of devices, providing applications based on the application requirements if required and providing the profile configurations for operation on the one or more networks during the one or more incidents.

In another exemplary embodiment, a profile manager for managing user and device profiles for response to one or more incidents includes a network interface communicatively coupled to one or more networks; a processor communicatively coupled to the network interface; and memory storing computer executable instructions, and in response to execution by the processor, the computer executable instructions cause the processor to: monitor inputs related to the one or more networks, a plurality of devices, and the one or more incidents; determine application requirements and profile configurations for the plurality of devices based on the inputs from the one or more networks and the one or more incidents; and, for each of the plurality of devices, provide applications based on the application requirements if required and provide the profile configurations for operation on one or more networks during one or more incidents.

In a further exemplary embodiment, a mobile device configured with a profile manager for managing user and device profiles for response to one or more incidents, the mobile device operated by an incident commander at the one or more incidents, includes one or more radios communicatively coupled to one or more networks; a processor communicatively coupled to the one or more radios; and memory storing computer executable instructions, and in response to execution by the processor, the computer executable instructions cause the processor to: detect one or more new agency devices and/or non-incident agency devices at the one or more incidents, wherein the one or more new agency devices and/or non-incident agency devices do not have access to applications or profiles to communicate with incident agency devices at the one or more incidents; determine application requirements and profile configurations for the one or more new agency devices and/or non-incident agency devices and for each of the new agency devices and/or one or more non-incident agency devices, provide applications based on the application requirements if required and provide the profile configurations for operation with the incident agency devices during the one or more incidents.

In various exemplary embodiments, a profile manager is described to dynamically assign, implement, manage, and update profiles of users (i.e., users' mobile devices) based on multiple incidents and network performance, wherein the profiles of the users include an application and/or security profiles of the user. The users can belong to an incident agency or a non-incident agency who provides mutual aid to incident agency user/first responder. The profile manager may reside in one or more Device Management Systems in one or more regions or agencies, or the profile manager may reside on a device itself. The profile manager assigns or updates profiles of the users based on various incident triggers, which include incident status, job role, user changes, agency/group affiliates, etc. Based on the aforementioned inputs, the profile manger creates application and/or a security profile for users corresponding to the type of the incidents. Further, the profile manager performs application and security compatibility for users corresponding to the various incidents to ensure interoperable communications and data sharing across the group of users. The profile manager provisions a list of such profiles in the users' device for defining incident scenarios and switches the profiles in the users' devices based on incident scenarios.

Further, the profile assignment and updates for agency and/or regional devices by the profile manager can be initiated by a computer-aided dispatcher (CAD) or the devices itself. When an incident agency (i.e., an agency, for example, a public safety agency such as police, fire, or other type of emergency responder, in whose jurisdiction an incident occurred) requires resources (e.g., additional emergency responders) from outside of the incident agency, a non-incident agency (i.e., another agency, for example, another public safety agency whose jurisdiction may overlap with or be outside of the jurisdiction of the incident agency) CAD can provide the resources and related data to a CAD of the incident agency. Additionally, when resources outside of a geographical region of the incident agency are required, the incident agency CAD may make a request to a regional or national entity to coordinate the inter-working of the non-incident agencies. The incident agency CAD can forward the data to the profile manager, and the profile manager can create and update profiles for non-incident agency devices responding to the incident and notify the incident agency CAD of these new and/or updated profiles. Further, the incident agency CAD can notify the non-incident agency CAD of the incident, and the non-incident agency CAD can authorize the profile manager to inter-work with the non-incident agencies devices and to update the profiles of the non-incident agency devices. Once the incident is over, the non-incident agency can notify the profile manager of this and the profile manager can restore the default profile of the non-incident agency devices. Also, when a new device of the incident agency (referred to herein as a 'new agency device,' i.e., an incident agency device newly responding to an incident as opposed to an incident agency that is already at the incident) or a non-incident agency device from another jurisdiction comes into the vicinity of an incident agency device (i.e., a device of the incident agency that has already responded to the incident), a profile manager of the new agency device or the non-incident agency device may request the profile manager of the incident agency device for a profile update in order to access necessary applications (i.e., applications that the new agency/non-incident agency device will need to use in responding to the incident). The profile manager of the incident agency device then may communicate with a security profile database, enable authentication, and arrange for an update of a profile of the new agency device or non-incident agency device. Further, the incident agency CAD is notified of the new agency/non-incident agency device's profile.

FIG. 1 is a block diagram of a profile manager 10. The profile manager 10 maintains, and provides for processing of, device profiles and may include an architecture such as described in FIG. 10. The profile manager 10 has various connections, such as to one or more networks 12, 14, to an incident agency CAD, to various data stores 18 (which may also be included in the profile manager 10), and to various mobile devices 20. The connections to the mobile devices 20 can be through a module 22 that provides Device Management (DM)/Subscriber Identity Module (SIM) and Over-the-Air (OTA) interfaces. The profile manager 10, via associated Network Management Systems (NMSs), monitors the utilization of the one or more networks' 12, 14, such as their network load and available capacity. Further, the profile manager 10 receives incident-related information, such as incident type, severity, etc. from the incident agency CAD 16 and, based on an assessment of network utilization and on an assessment of applications and QoS needed for the incident type, determines whether to enable a Tier 1, Tier 2, or Tier 3 profile per role/incident type. The profile manager 10 then pushes the appropriate profile to the mobile devices 20 of incident responders, for example, through a profile manager client 24 resident on each such mobile device.

Note, the categorization of an incident, and correspondingly profiles, into Tier 1, 2, or 3 is presented for illustration purposes, and those of ordinary skill in the art will appreciate other categorizations are contemplated. The incident agency CAD 16 can be configured to provide an incident trigger (incident type, resource types, etc.) to the profile manager 10, which trigger triggers a downloading of an appropriate profile (Tier 1, 2, or 3) to responders to the incident. In various embodiments, a Tier 1 profile may include 'must have' applications and network/application access that are specific to specific job roles and/or incident types; a Tier 2 profile may include applications and network/application access that are more generally incident and business essential; and a Tier 3 may include applications and network/application access that are non-incident and non-business essential.

The data stores 18 may include a policy database for each of the one or more networks 12, 14 accessible by the profile manager 10. In an exemplary embodiment, the network 12 may be a public safety network, such as a regional or national network, and the network 14 may be a commercial network such as a cellular (e.g., LTE) or Wi-Fi network, that may be operated by a local, regional, or national service provider. Each policy database may include policy definitions 26 of the tiers, job roles, incident types (e.g., emergency, high, normal, etc.), and associated applications (e.g., Short Message Service (SMS), Voice over Long Term Evolution (LTE), real-time streaming video, CAD, etc.).

The profile manager 10 is configured to change the profiles on the mobile devices 20 based upon an incident or multiple incidents, that is, to determine, and download to, the users' mobile devices a temporary profile that will allow the users/devices to perform their requisite tasks and inter-operate with each other and one or more responding agencies (e.g., the incident agency and/or any agency asserting control over the responders) at the incident. That is, based on a given incident(s), the profile manager 10 is configured to change the user, or device, profiles in order to provide applications required for responding to the incident (i.e., determining the application requirements), to define configurations (e.g., groups, user lists, security, codec, group scan) appropriate for the incident(s), and to manage a priority of the users responding to, and the applications utilized at, the incident(s). This temporary profile can become the 'defined incident profile(s)' for incident(s). In the determination of such profiles, the profile manager 10 may consider network status and may determine the priority of applications to load for users of the networks 12, 14 and that they can have access to, utilizing the network performance and user priority to provide for optimized applications, prioritization, and network preferences. With the profile manager 10, application and security profile compatibility is assured despite disparate mobile devices 20 from different agencies. The profile manager 10 can check existing user device profiles, and load only what is needed to avoid incompatibilities and to assure interoperability across devices and OSs.

FIGS. 2A, 2B, 3A, and 3B are a flow chart of a profile manager process 30 that can be implemented by the profile manager 10 and that provides for determining profiles for, and applications accessible by, incident responders in association with the occurrence of one or more incidents. The profile manager process 30 can include various example inputs 32 received by the profile manager 10, such as:

Incident type and number of incidents
Incident severity
Incident duration and incident time of day
The number of responders required
Rate of change of incident severity
Types of responders with related applications
Past incident history, such as profile-types and applications utilized by responders to past incidents of similar type or tier
Network utilization (e.g., obtained from an NMS)
Currently available networks (e.g., obtained from an NMS or from users' mobile devices)
Mobile device capabilities
Available profiles for devices located in a given geographical region The profile manager process 30 also determines an incident type, or tier (steps 34, 36, 38). For example, the profile manager 10 may categorize the incident in one or three Tiers, that is, Tiers 1, 2, and 3, The profile manager process 30 also determines an incident contact list (steps 42, 44, 46). The incident type and incident contact list can be provided to the profile manager 10 by the incident agency CAD 16 or the like, for example, automatically upon a reporting of an incident or in response to a request from the profile manager.

The profile manager process 30 also determines a profile setup in association with the determined incident type or tier (steps 48, 50, 52). That is, each incident type has an associated setup profile). For example, the setup profile for Tier 1 can include (step 48):
Streaming video
Map/location
Secure Push-to-Talk (PTT)
CAD/Dispatch
Video conferencing
VoLTE with Private Branch Exchange (PBX)
White boarding
Tier 1 Interoperable Security profile.
The setup profile for Tier 2 can include (step 50):
Map/location
PTT
CAD/Dispatch
Video conferencing
VoLTE w/ PBX
Tier 2 Interoperable Security profile.
And the setup profile for Tier 3 can include (step 52):
PTT
CAD/Dispatch
Tier 3 Interoperable Security profile.

Again, these are presented for illustration purposes, and other embodiments are also contemplated. The profile manager 10 is configured to provision a list of profiles in the mobile devices 20 per predefined incident scenarios, and to dynamically switch the profiles configured in the mobile devices when deemed appropriate by the profile manager 10. Thus, the profile manager 10 includes determining application requirements for the incident(s).

Subsequent to determining a profile setup in association with the determined incident type or tier, the profile manager process 30 aggregates all incident resource requirements (step 54), such as the applications required, the number and/or type of responders required, and the bandwidth required. The profile manager process 30 further may concurrently and continually monitor the inputs 32 for updates. The inputs 32 can be considered triggers that can cause dynamic updates of the profiles through the profile manager 10 and based on continuous monitoring of the incident. For example, profile updates may be triggered by a change in an incident status or a job role, a user changing his or her mobile device, a change in an agency/group affiliation, etc. The profile manager 10, as described herein, also is configured to dynamically create an application and security profile for various mobile devices 20 based on the inputs 32 for groups of users across multiple incidents.

The profile manager process 30, after aggregating all of the incident resource requirements, determines if any new incidents have occurred (step 58). These are incidents that affect usage on any of the networks 12, 14. If there have been any new incidents (step 58), then the profile manager process 30 determines how many of the new incidents are in the given incident area (step 59), checks what application(s) are required for all such incidents (step 61) and returns to the steps 34, 36, 38.

If the profile manager process 30 has accommodated all of the incidents in the given incident area (step 58), the profile manager process 30 determines which incident mobile devices 20 are app-capable, according to the appropriate setup profile (step 61), and determines which non-incident mobile devices 20 are available and app-capable (step 62). The incident mobile devices are (incident) agency-issued devices, and may include the profile manager client 24 operating thereon. The new agency devices and/or non-incident mobile devices may be 'bring-your-own-device' (BYOD) devices or personal devices associated with users at the incident. If some of the mobile devices are not app-capable (steps 60, 62), then the profile manager process 30 may adjust the apps supported by the mobile devices in the area (step 64). In such an event, the profile manager 10 can cause an adjustment of the apps residing on a mobile device or can cause a download and installation of a new app on the mobile device. The profile manager 10 causes applications to be delivered to the mobile devices, if required, based on application requirements for the incident. If the mobile devices are app-capable (steps 60, 62), the profile manager process 30 is continued in FIGS. 3A and 3B (connector 66).

Figure 3A:
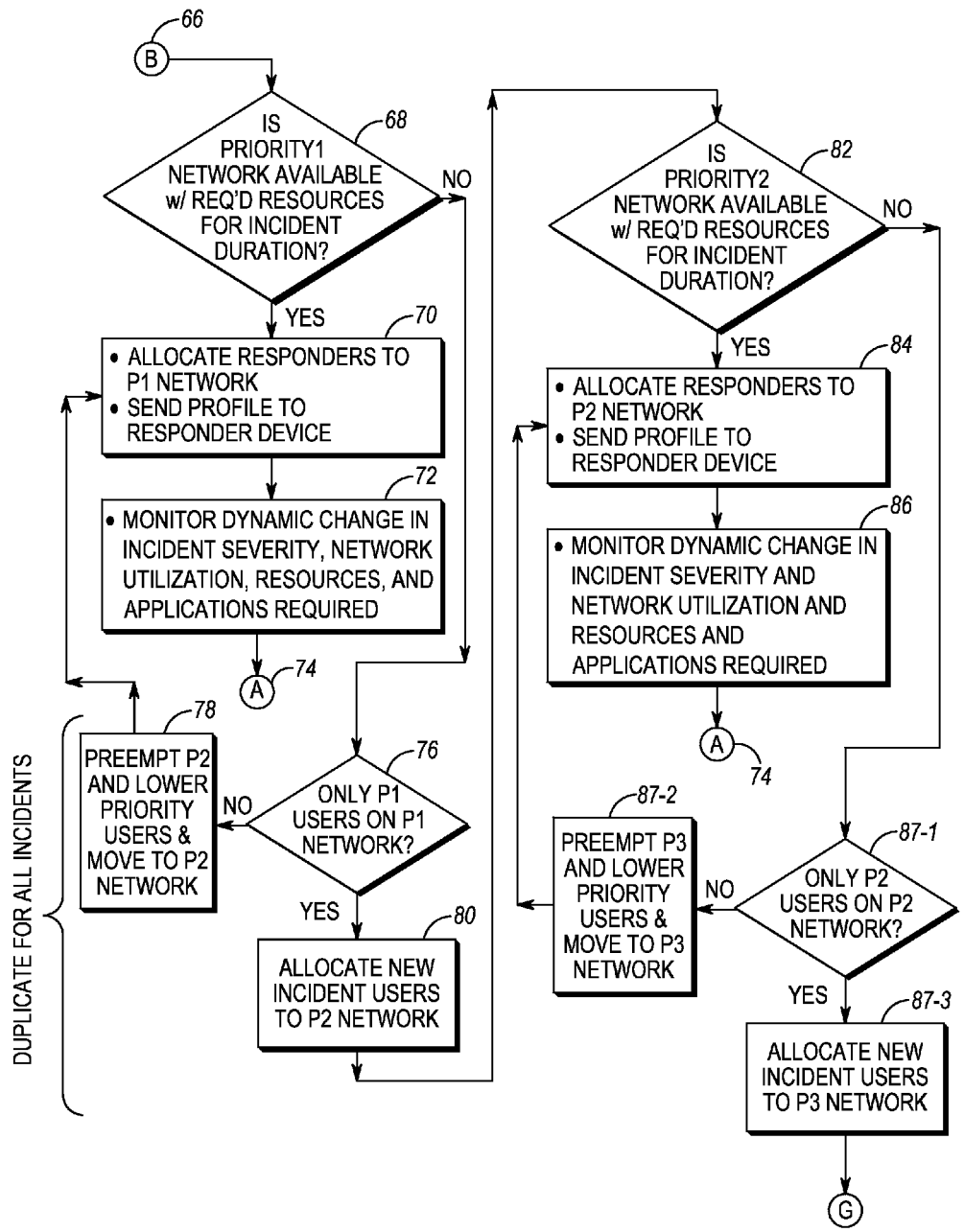
FIGS. 3A-3B are a continuation of the flowchart of FIGS. 2A-2B in accordance with some embodiments
Figure 3B:
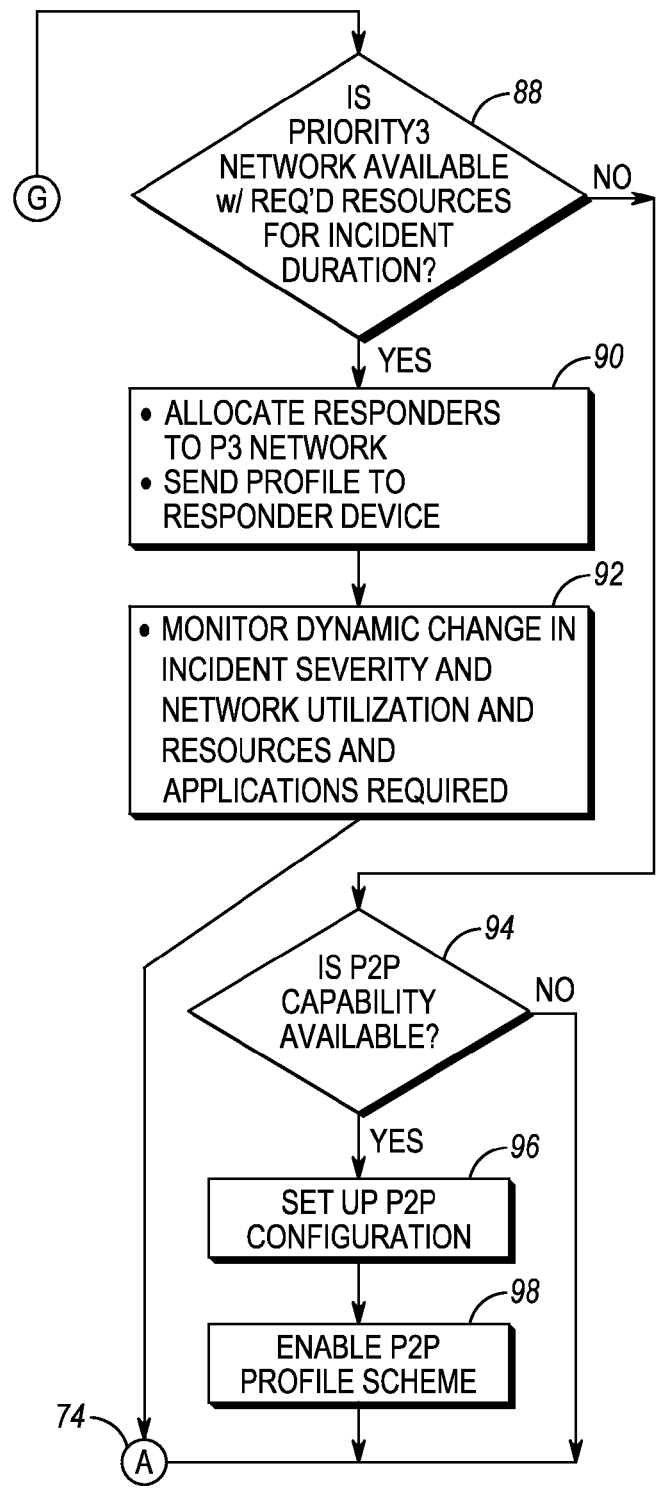

In FIG. 3A, the profile manager process 30 checks if a highest priority, that is, a priority 1 (P1), network is available at the incident scene and has the required resources for a duration of the incident (step 68). If a P1 network (e.g., network 12) is available and has the requisite resources, the profile manager process 30 allocates the responders (incident agency and non-incident agency) to the P1 network and sends an appropriate profile (i.e., a profile appropriate for the incident and for operating in the P1 network) to the responders' mobile devices 20 (step 70). For example, the P1 network can be a public safety network. After allocating the responders to the P1 network, the profile manager process 30 can include monitoring for dynamic changes in incident severity, network utilization, resources, and applications required (step 72) by returning to FIGS. 2A and 2B through connector 74.

If not enough resources are available at the P1 network (step 68) to support all incident responders, the profile manager process 30 checks if the P1 network resources are sufficient to support only the highest priority, that is, priority 1 (P1), responders and whether the P1 responders are on the P1 network (step 76). If there are enough resources available at the P1 network to support the P1 responders, the profile manager process 30 preempts lower priority users, that is, priority 2 (P2) users and other lower priority users (step 78) and moves them to a next lower priority, that is, a priority 2 (P2), network (e.g., network 14). Further, the profile manager process 30 returns to step 70, that is, allocates the P1 responders to the P1 network if they are not yet on the P1 network and sends an appropriate profile to each of the P1 responders' mobile devices 20. Further, the profile manager process 30 determines to allocate any new incident users to the P2 network (step 80) and checks if the P2 network is available with required resources for an incident duration (step 82).

If the P2 network is available (step 82), the profile manager process 30 allocates the non-P1 responders to the P2 network and sends the appropriate profile to the responders' mobile devices 20 (step 84). After allocating the non-P1 responders to the P2 network, the profile manager process 30 can include monitoring for dynamic changes in incident severity, network utilization, resources, and applications required (step 86) by returning to FIGS. 2A-2B through the connector 74.

If there are not enough P2 network resources for the non-P1 responders (step 82), the profile manager process 40 checks if only P2 users are supported on the P2 network (step 87-1), and if not, the priority 3 (P3) and lower priority users are preempted and are moved to a yet next lower priority, that is, a priority 3 (P3), network (step 87-2). Further, the profile manager process 30 and returns to step 84, that is, allocates the P2 responders to the P2 network if they are not yet on the P2 network and sends an appropriate profile to each of the P2 responders' mobile devices 20. Further, the profile manager process 30 determines to allocate any new incident users to the P3 network (step 87-3). The profile manager process 30 then checks if the P3 network is available with required resources for the incident duration (step 88). If the P3 network is available with the required resources (step 88), the profile manager process 30 allocates the remaining responders to the P3 network and sends an appropriate profile to the responders' mobile devices 20 (step 90). After allocating the remaining responders to the P3 network, the profile manager process 30 may continue monitoring for dynamic changes in incident severity, network utilization, resources, and applications required (step 92) by returning to FIGS. 2A-2B through the connector 74.

If the P3 network does not have enough resources (step 88), the profile manager process 30 may check if a peer-to-peer (P2P) capability is available at the incident scene (step 94). For example, the P2P capabilities can include IEE 802.11 and variants thereof, or any other Wireless Local Area Network (WLAN) technique. If so, the profile manager process 30 may set up a P2P configuration (step 96) and enabling a P2P profile scheme (step 98), and if not and after the step 98, the profile manager process 30 can return to FIGS. 2A-2B through the connector 74.

Note, in the steps 70, 84, 90, the profile manager process 30 includes providing profile configurations to the mobile devices 20. The profile configurations determine which of the networks 12, 14 (or other networks) the mobile devices 20 are assigned to, their priority, their security, application permissions, group memberships, and the like. Note, these profile configurations can be viewed as temporary profiles during the incident(s), and at the conclusion of the incident, the mobile devices 20 can return to the original profile configurations associated therewith. For example, the inputs related to the networks 12, 14 can determine network assignments for available network bandwidth based on the application requirements.

Note, the profile manager process 30 is described above generally, and there can be a plurality of users and each can be segmented as appropriate between the P1, P2, P3, and P2P networks based on priority, tier, available resources, etc. Further, this process can be dynamic based on the inputs 32 over time. With the profile manager process 30, the mobile devices 20 can be automatically configured for their profile and applications to ensure reliable communications at the incident. With the profile manager process 30, the profile manager 10 can assess network bandwidth across the P1, P2, and P3 networks, continuously monitor, assess applications and QoS, and optimize network usage via the device profiles via a Tier strategy. Preferably, the managing of user profiles is tiered according to network utilization and application needs.

The profile manager 10 is configured to dynamically implement, manage, and change applications, user allocations, and security profiles across multiple networks and/or operating systems (OSs) (same or disparate) depending on the needs of current client usage, multiple incident needs, and network utilization. The profile manager 10 gets the inputs regarding network utilization and network availability for each of multiple networks 12, 14 from a corresponding NMS and/or a mobile device 20 being served by the network. As described herein, the profile manager 10 may get the inputs 32 of the incident details (e.g., incident type, incident severity, number of responders required, incident duration, incident rate of change, common security level required) from the incident agency CAD 16 or a 911 call center or any other incident management system. The profile manager 10 takes the inputs 32, defines a network preference list (e.g., the network 12 is a first priority (P1) network and the network 14 is a second priority (P2) network), and selects which network and profile and/or application to utilize for a given device or group of devices. Further the profile manager 10 continuously monitors the specified inputs 32, dynamically sends updates for change of networks, and updates profiles to be utilized.

The profile manager 10 executes the various processes described herein by taking the inputs 32 and determining required applications and application configuration parameters based on the inputs 32. The profile manager 10 determines an incident agency contact list and the groups (e.g., Push-to-Talk (PTT), Push-to-Video (PTV), or push to multimedia) to append to new agency devices and/or existing non-incident agency devices. The profile manager 10 takes existing profiles in a profile database for device/users and updates profiles (or creates an instance of the profile for this incident) and notifies a user controlling entity (e.g., DM) that profiles are ready.

The profile manager 10 can determine the highest level of an interoperable security profile supported by available mobile devices for the incident. This common interoperable security profile is then sent to the incident group, that is, the mobile devices responding to the incident. The profile manager 10 can perform the profile modification for a specified period of time or a specified condition, after which the profile is restored to its original state. The profile manager 10 takes existing profiles maintained in the profile database for users' and/or their mobile device and creates and/or updates these profiles for device IDs and affiliates with User IDs. These profiles can be configured on their corresponding mobile devices to enable peer-to-peer (P2P) execution and direct communication of profile manager 10 information.

The profile manager 10 determines which mobile devices 20 to update based on application and device capabilities. The profile manager 10 executes the various processes described herein by taking the inputs 32 and network utilization across multiple networks and determining what application and application configurations parameters to create or update and to send to the end users' devices. The profile manager 10 can determine if users are moved to a new job role or an existing job role and can resolve conflicts in access to applications (across incident and non-incident agencies). The profile manager 10 can update profile application/APN and security access based on user roles, agency, and regional access. That is, application access may vary across users, agencies, and regions and the profile manager 10 can resolve any conflicts and provide requisite access when needed for incident response. Further, the profile manager 10 can assesses the network bandwidth, continuously monitor and assess applications and QoS, and optimize network usage via the device profiles and via the Tier strategy.

Figure 4A:
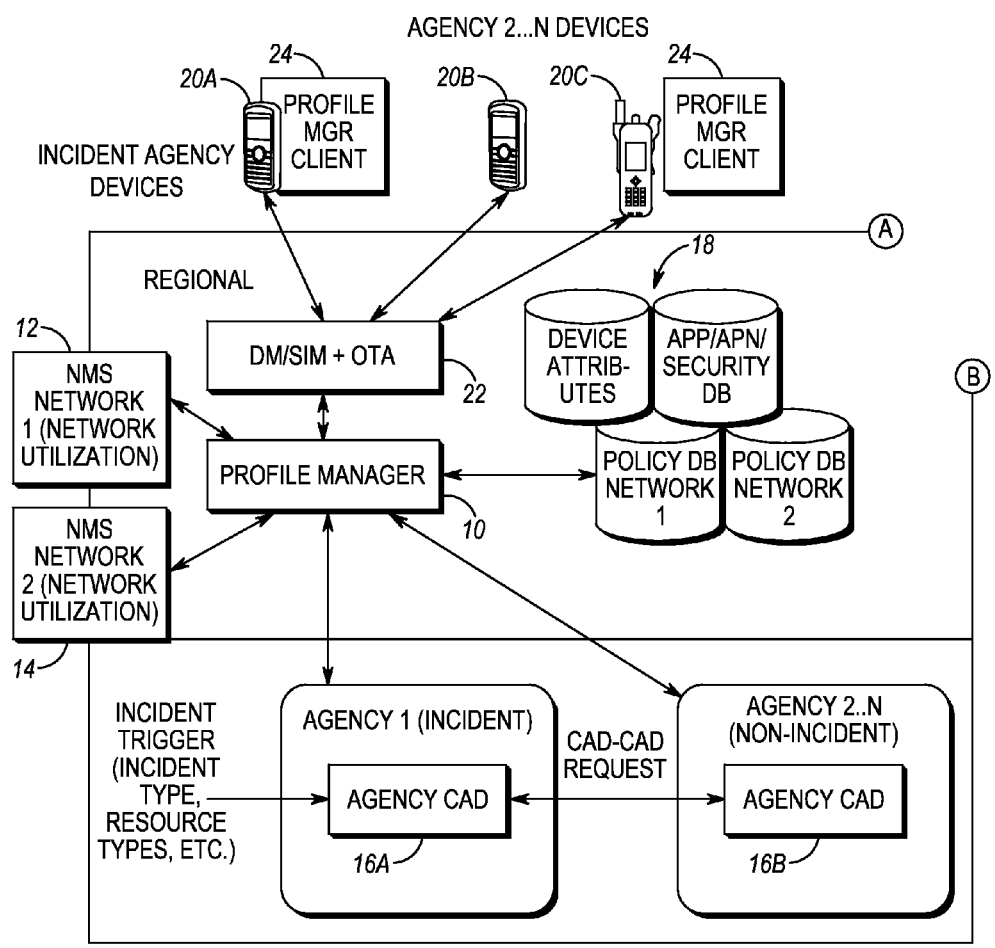
FIGS. 4A-4B are a block diagram of the profile manager of FIG. 1 for network/CAD-initiated subscriber profile assignments or updates for agency mobile devices in accordance with some embodiments.
Figure 4B:
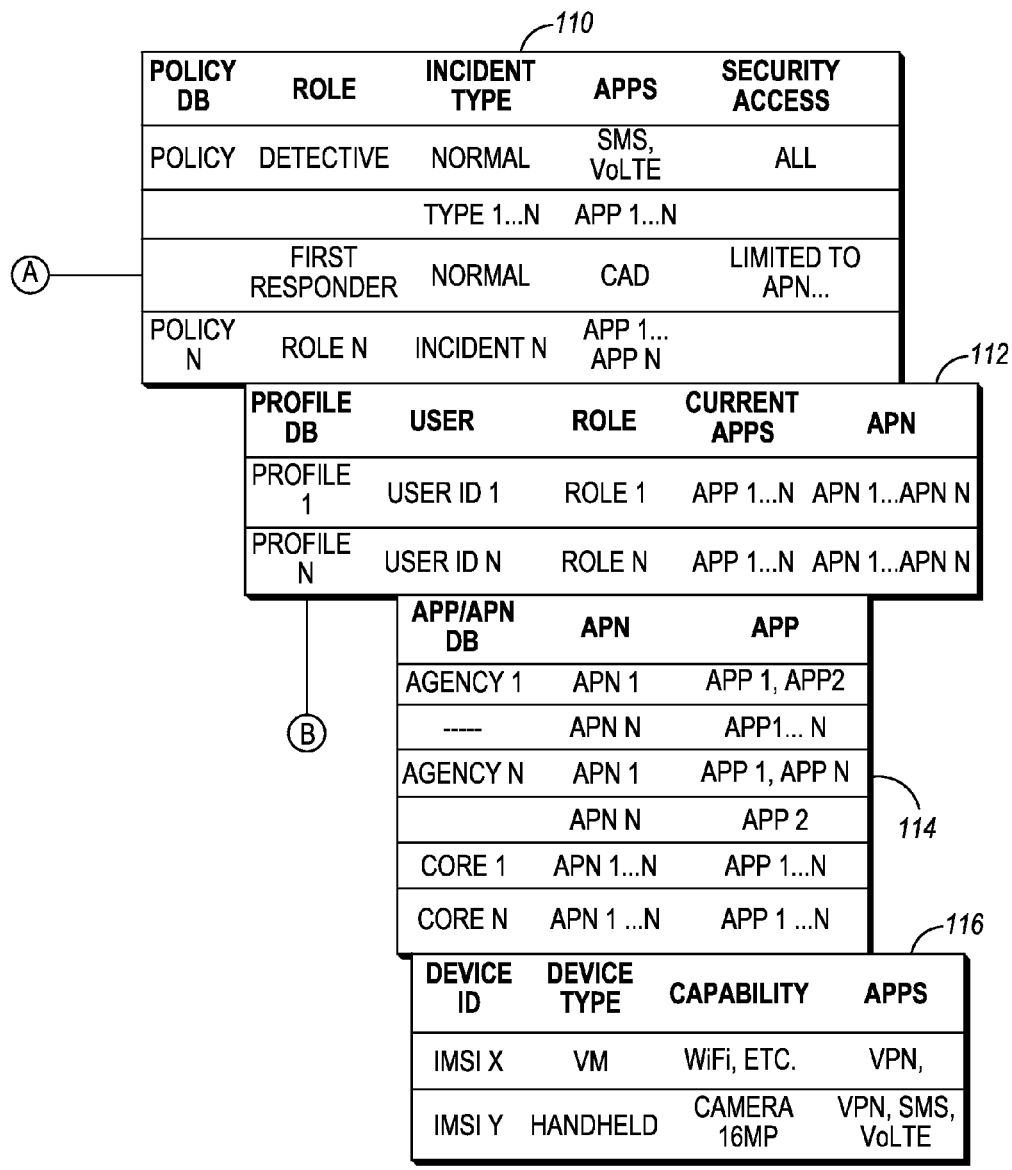

FIGS. 4A, 4B, 5A, and 5B are a block diagram (FIGS. 4A and 4B) of the profile manager 10 in accordance with another embodiment and a flowchart (FIGS. 5A and 5B) depicting an agency subscriber profile process 100 performed by the profile manager 10 of FIGS. 4A and 4B for network/CAD-initiated subscriber profile assignments or updates for agency mobile devices 20. Specifically, in the exemplary embodiment of FIGS. 4A and 4B and 5A and 5B, a network-initiated profile transfer is enabled through the incident agency CAD 16 or an incident administrative function. In FIGS. 4A and 4B, the profile manager 10 is configured similarly as in FIG. 1, but can include connections to an incident agency (agency 1) and corresponding incident agency CAD 16A, and to one or more non-incident agencies (that is, agencies 2-N) and corresponding non-incident agency CADs 16B . . . 16N. The CADs 16A, 16B, . . . 16N can also be inter-connected for CAD-to-CAD requests. The profile manager 10 can be connected to mobile devices associated with each of the incident agencies, such as mobile devices 20A associated with incident agency 1 and CAD 16A, mobile devices 20B associated with non-incident agency 2 and CAD 16B, and mobile devices 20N associated with non-incident agency N and CAD 16N.

Here, the incident agency, that is, agency 1, requests resources from one or more non-incident agencies, that is, agencies 2 . . . N (within the state or region of incident agency 1 or outside (another state or region)). Responders from the non-incident agencies 2 . . . N use their existing devices (from their current agency) and travel to the incident to provide aid and assistance. Each responding non-incident agency mobile device 20B, 20C is updated to work with the apps of incident agency 1, including the local and regional apps of the incident agency, etc. Again, the profile manager 10 can be implemented over one or more Device Management Systems in one or more regions or agencies 1 . . . N.

FIGS. 4A and 4B also includes a visualization of data that may be maintained in the data stores 18, such as a policy database 110, a profile database 112, an app database 114, and a device ID database 116. These databases 110, 112, 114, 116 can be used by the profile manager 10 to configure the mobile devices 20A, 20B, 20C. The policy database 110 includes various policies that may vary based on one or more of job roles (e.g., detective, first responder, Emergency Medical Technician (EMT), etc.), incident types (e.g., normal, type 1 . . . N, etc.), apps for the job role and/or incident type (e.g., SMS, VoLTE, CAD, app 1 . . . N, etc.), and security access. The profile database 112 can include profiles for different users (based on user ID), different roles, different apps, and different Access Point Names (APNs). The app database 114 includes a list of APNs and apps associated with each of multiple agencies. The device ID database 116 includes a list of the mobile devices 20A, 20B, 20C and can include the device type (e.g., Vehicle modem (VM), handheld, tablet, etc.), device capabilities (e.g., Wi-Fi, camera, etc.), and installed apps.

Figure 5A:
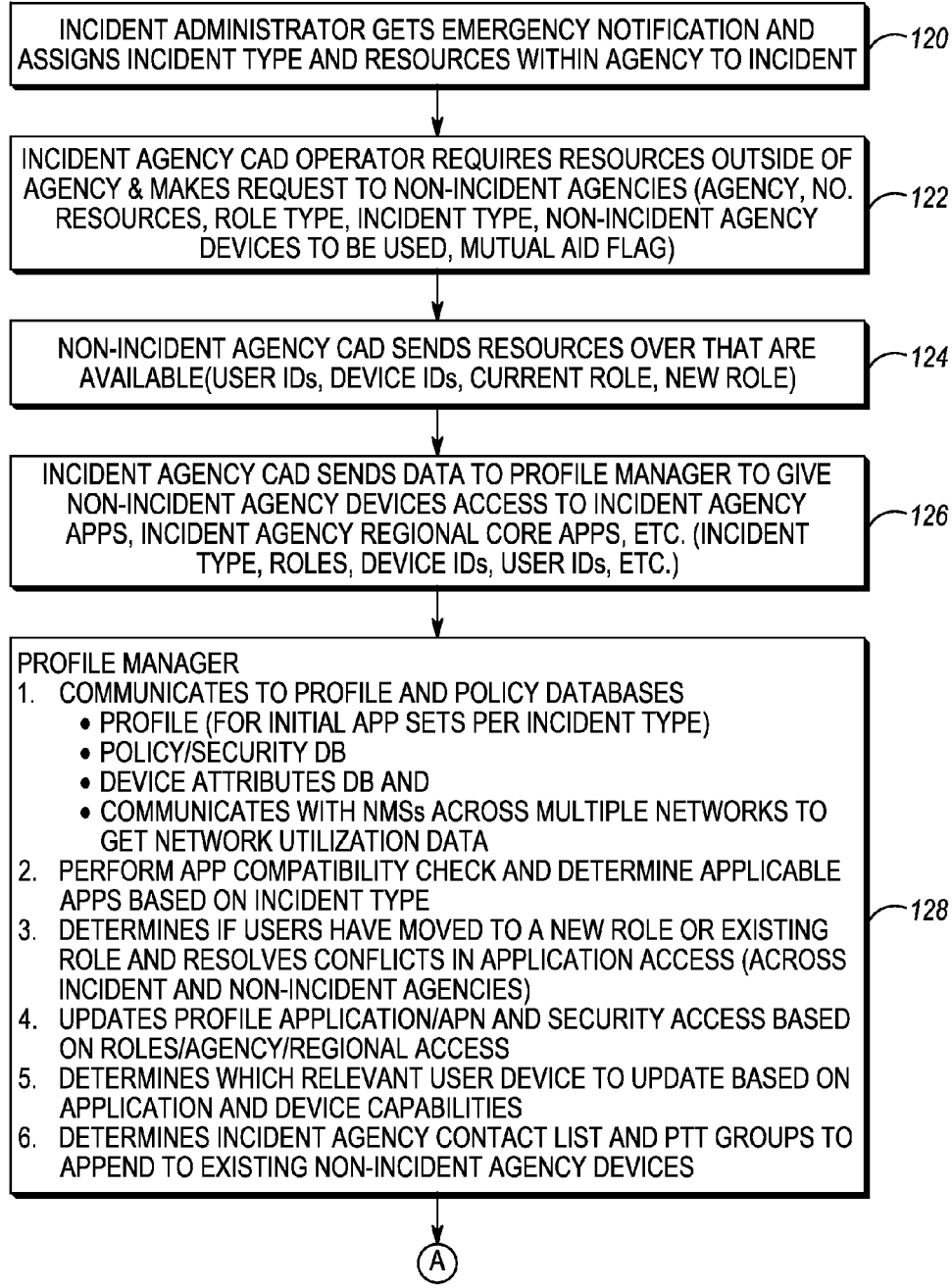
FIGS. 5A-5B are a flowchart of an agency subscriber profile process for network/CAD-initiated subscriber profile assignments or updates for agency mobile devices in accordance with some embodiments.
Figure 5B:
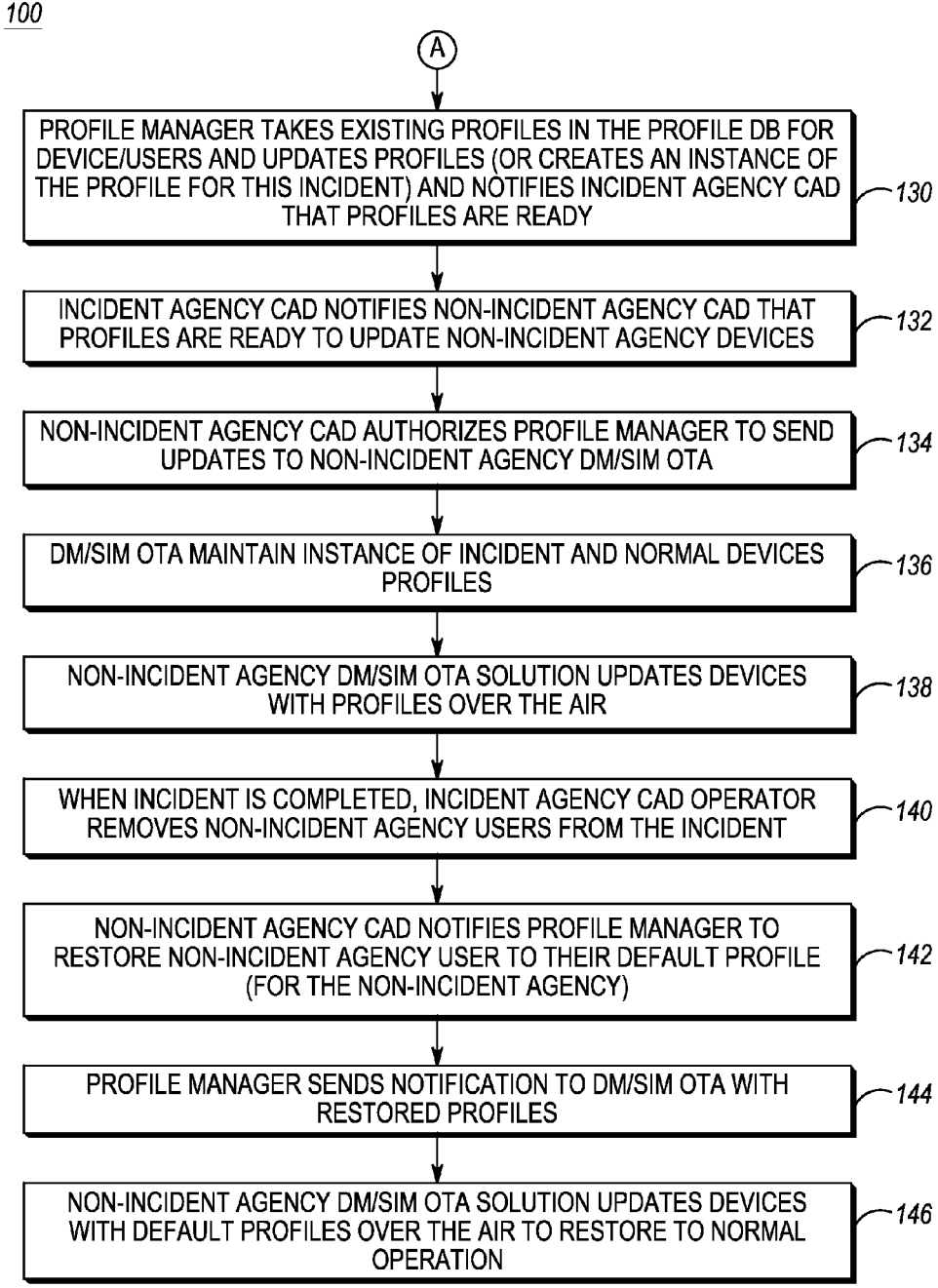

FIGS. 5A and 5B illustrate a flowchart of the agency subscriber profile process 100 that can be implemented by the profile manager 10 depicted in FIGS. 4A and 4B. First, an incident administrator gets an emergency notification of an incident and assigns an incident type and resources within the agency for the incident (step 120). In this exemplary embodiment, the incident agency CAD 16A operator requires resources outside of the incident agency 1 and makes a request for non-incident agencies 2 . . . N. The request may include, for example, an agency identifier (of both the requesting agency and the requested agency), a number of resources requested, role type(s), incident type(s), new agency devices or non-incident agency devices 20B, 20C to be used, a mutual aid flag indicating that mutual aid is being requested, etc. (step 122). The non-incident agency 2 . . . N CAD, for example, CAD 16B, sends the requesting incident agency 1 information on the resources that are available (such as user IDs, device IDs, current roles, new roles) (step 124). The incident agency CAD 16A sends data to the profile manager 10 to give the new agency devices or non-incident agency devices 20B, 20C access to incident agency apps, incident agency regional core apps, etc. (which data may include incident type, roles, device IDs, user IDs, etc.) (step 126).

The profile manager 10 is configured to (at step 128):
1. Communicate with the databases 110, 112, 114, 116, wherein The profile database 110 provides the initial app sets per incident type, The policy database 112 is accessed for determining roles, apps, APN, The device ID database 116 provides the current devices 20A, 20B, 20C, Communicates with NMSs across multiple networks 12, 14 to get network utilization data;

2. Perform app compatibility checks and determine applicable apps based on incident type;

3. Determine if users have moved to a new role or existing role and resolve conflicts in application access (across incident and non-incident agencies 1 ... N);

4. Update profile applications and/or APNs and security access based on job roles, the incident agency and the agency of the user (if different), and regional access;

5. Determine which relevant user device to update based on application and device capabilities; and 6. Determine an incident agency contact list, PTT groups, and any other groups to append to new agency devices and/or existing non-incident agency devices.

The profile manager 10 takes existing profiles in the profile database 110 for users, that is, for their mobile devices, and updates profiles (or creates an instance of the profile for this incident) for that user/device. The profile manager 10 then notifies the incident agency CAD 16A that profiles are ready (step 130). The incident agency CAD 16A notifies the non-incident agency CAD, that is, CAD 16B, that profiles are ready for updating of the new agency devices and/or non-incident agency devices 20B, 20C (step 132). The non-incident agency CAD 16B authorizes the profile manager 10 to send updates to a non-incident agency DM/SIM OTA (step 134). The DM/SIM OTA maintains instances of incident-related profiles (i.e., the updated profiles) and normal, or default, profiles for the new agency devices and/or the non-incident agency devices 20B, 20C (step 136). The non-incident agency DM/SIM OTA then updates the devices 20B, 20C with the updated profiles over the air (step 138).

When the incident is completed, the incident agency CAD 16A operator removes the non-incident agency users/devices and the agency user's new devices from the incident (step 140). The incident agency CAD 16A notifies the profile manager 10 to restore the non-incident agency users or the agency user's new devices to their normal, or default, profile (i.e., the profile for the non-incident agency) (step 142). The profile manager 10 sends a notification to DM/SIM OTA with the restored profiles (i.e., the normal, or default, profiles) (step 144). The non-incident agency DM/SIM OTA then updates the devices 20B, 20C with the normal, or default, profiles over the air to restore the devices to normal operation (step 146).

Figure 6:
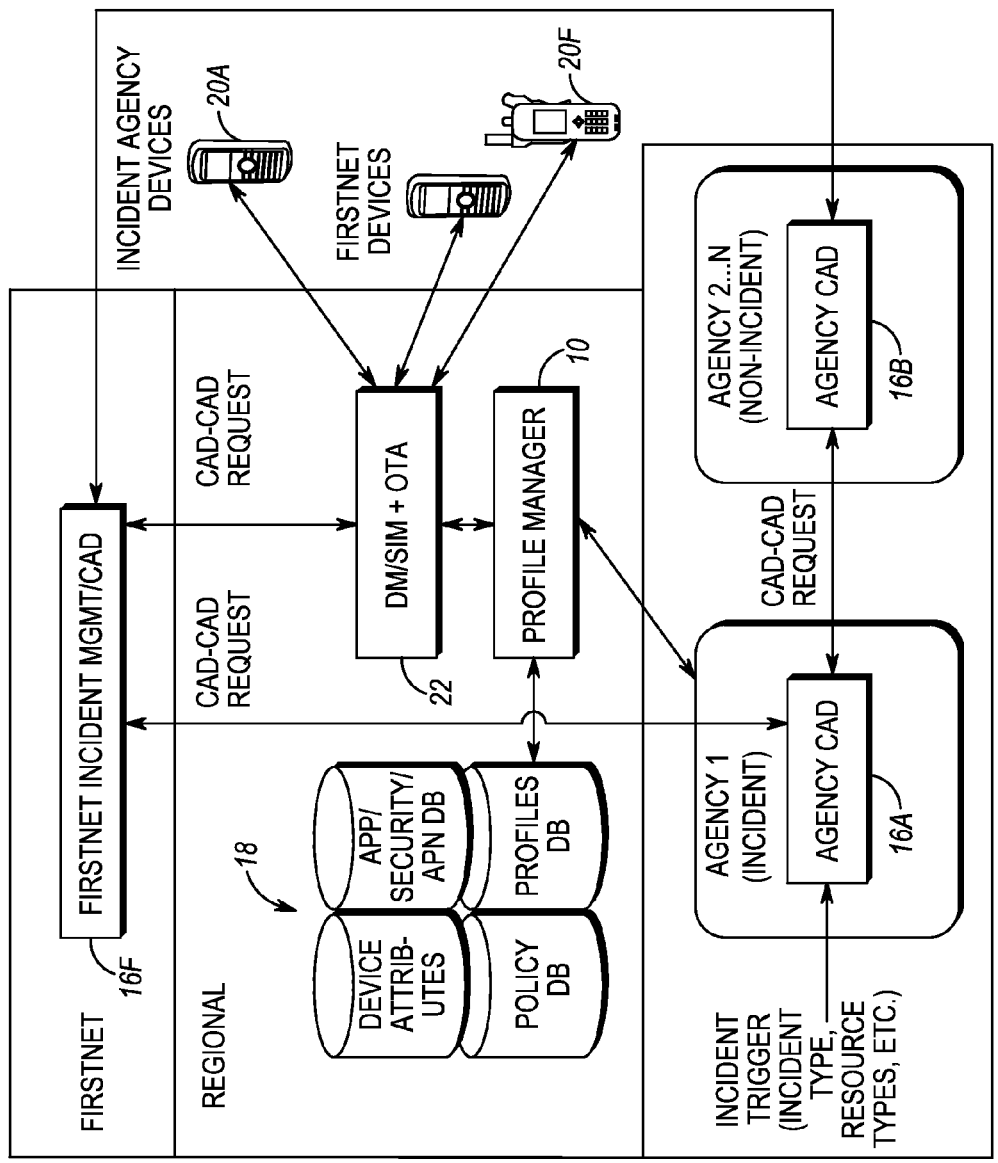
FIG. 6 is a block diagram of the profile manager of FIG. 1 for network/CAD-initiated subscriber profile assignments or updates for regional/national mobile devices in accordance with some embodiments.
Figure 7A:
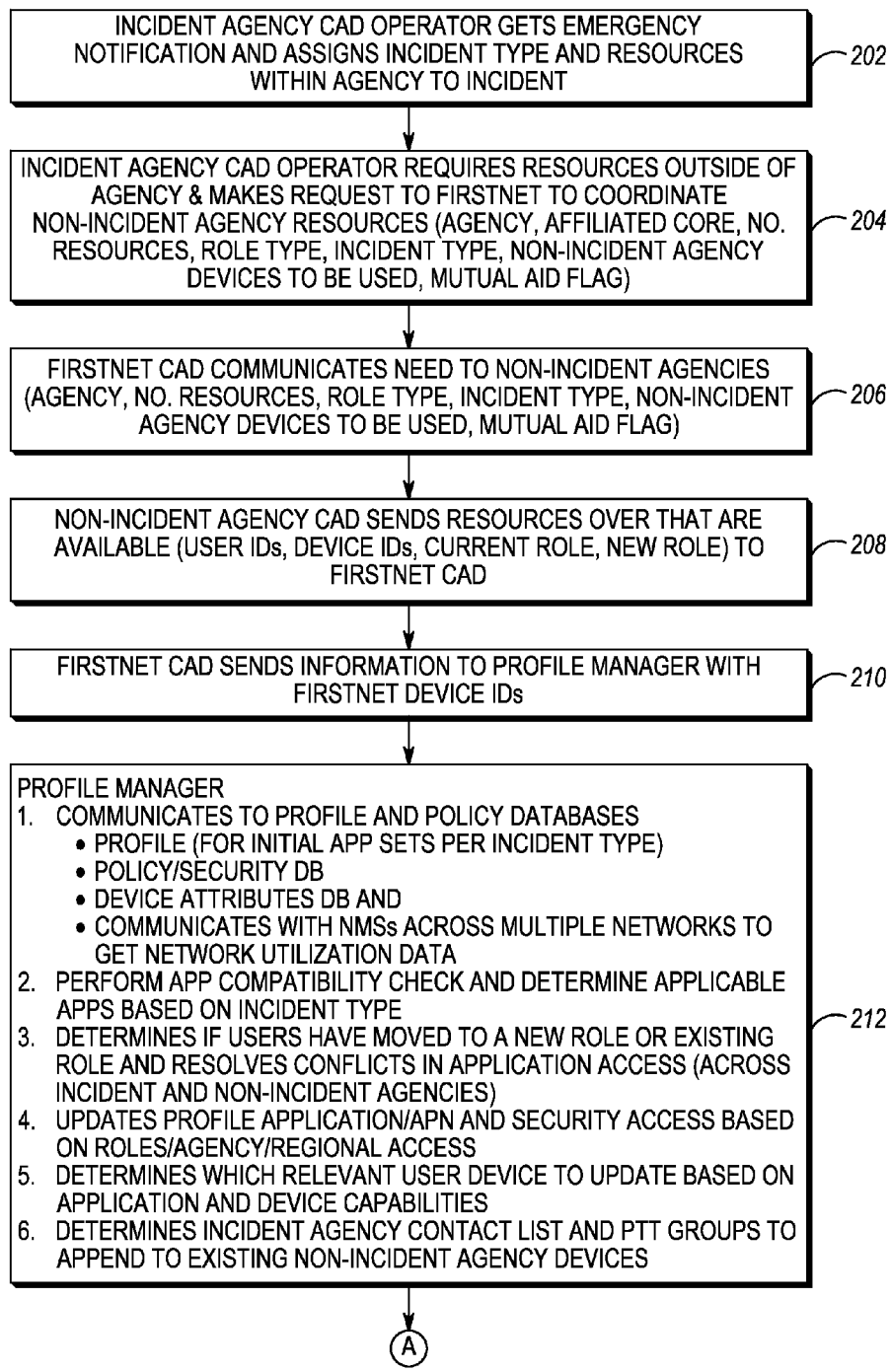
FIGS. 7A-7B are a flowchart of an agency subscriber profile process for network/CAD-initiated subscriber profile assignments or updates for regional/national mobile devices in accordance with some embodiments.
Figure 7B:
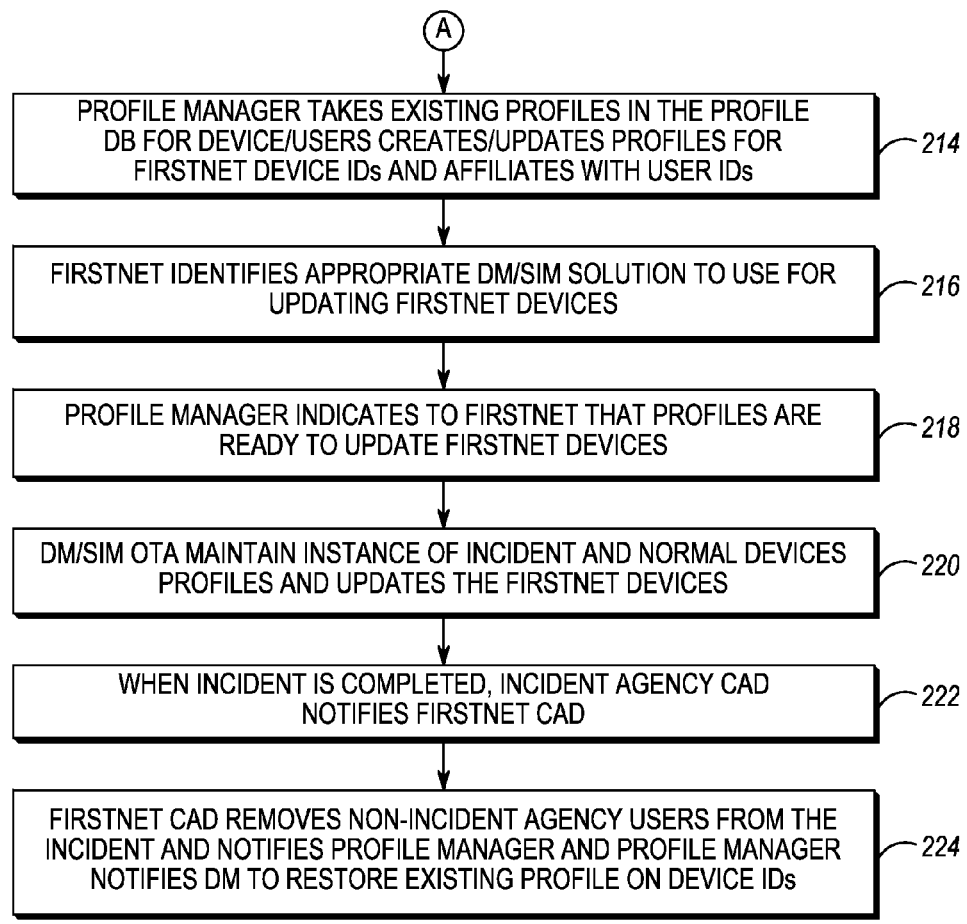

FIGS. 6, 7A, and 7B are a block diagram (FIG. 6) of the profile manager 10 in accordance with another embodiment and a flowchart (FIGS. 7A and 7B) depicting a process 200 executed by the profile manager 10 of FIG. 6 in performing network/CAD-initiated subscriber profile assignments or updates for regional devices 20, such as through a regional subscriber profile process. Specifically, in the exemplary embodiment of FIGS. 6, 7A, and 7B, the network-initiated profile transfer is enabled through the incident agency CAD 16A or an incident administrative function. Here, the incident agency notifies a regional or national agency (referred to herein as the "assisting agency") that assistance is required. The assisting agency then seeks out resources from one or more regional/national agencies and one or more agencies outside of the regional/national agencies ("the non-incident agencies") on behalf of the incident agency. Responders from a non-incident agency may be given a device from the assisting agency, and the responders travel to the incident to aid and assist. Their devices are updated to work with the incident agency's apps, the incident agency's regional apps, the incident regional apps, etc. In FIG. 6, the profile manager 10 is configured similarly as in FIGS. 1 and 4, and further includes a connection to the assisting agency management system/CAD 16F and to various mobile devices 20F of the assisting agency.

In FIGS. 7A and 7B, the regional subscriber profile process 200 is illustrated. The incident agency CAD 16A operator gets an emergency notification of an occurrence of an incident and assigns an incident type and resources within the agency to the incident (step 202). The incident agency CAD 16A operator requires resources outside of the incident agency and makes a request to an assisting regional/national agency to coordinate non-incident agency resources (i.e., resources of the one or more regional/national agencies and the one or more agencies outside of the regional/national agencies whose help is sought). The request may include information such as an identifier of the incident agency, affiliated core, number of resources needed, role types needed, incident type, new agency devices and/or non-incident agency devices to be used, a mutual aid flag, and so on (step 204). The assisting agency CAD 16F then communicates a need to the non-incident agencies 2 ... N, which request may includes an identifier of the incident agency, a number of resources needed, role type(s) needed, incident type(s), new agency devices and/or non-incident agency devices to be used, a mutual aid flag, and so on (step 206). A non-incident agency CAD, such as CAD 16B, then sends resources over that are available (user IDs, device IDs, current role, new role) to the assisting regional/national agency CAD 16F (step 208).

The profile manager 10 is configured to (step 212):
1. Communicate with the databases 110, 112, 114, 116

The profile database 110 provides the initial app sets per incident type,

The policy database 112 is accessed for determining roles, apps, APN,

The device ID database 116 provides the current devices 20A, 20B, 20C,

Communicates with NMSs across multiple networks 12, 14 to get network utilization data;

2. Perform app compatibility checks and determine applicable apps based on incident type;

3. Determine if users have moved to a new role or existing role and resolve conflicts in application access (across incident and non-incident agencies 1 ... N);

4. Update profile applications, APNs, and security access based on job roles, the incident agency and the agency of the user (if different), and regional access;

5. Determine which user devices to update based on application and device capabilities; and 6. Determine an incident agency contact list and PTT groups to append to new agency devices and/or existing non-incident agency devices.

The profile manager 10 takes existing profiles in the profile database 110 for users/device, and creates and/or updates profiles for device IDs and affiliates with user IDs associated with the assisting agency devices 20F (step 214). The assisting agency identifies the appropriate DM/SIM solution to use in updating the devices 20F (step 216). The profile manager 10 indicates that profiles are ready for updating of the assisting agency devices 20F (which devices 20F are being provided to the non-incident agency responders, that is, the responders of the one or more regional/national agencies and the one or more agencies outside of the regional/national agencies whose help is sought) (step 218). The DM/SIM OTA maintains instances of the incident and normal, or default, profiles of the devices and updates the devices 20F (step 220). When the incident is completed, the incident agency CAD 16A notifies the assisting regional/national agency CAD 16F (step 222). The assisting agency CAD 16F removes non-incident agency users or the agency user's new devices from the incident and notifies the profile manager 10, which notifies the DM/SIM OTA to restore the normal, or default, profile on the device ID associated with the assisting agency devices 20F (step 224).

Figure 8:
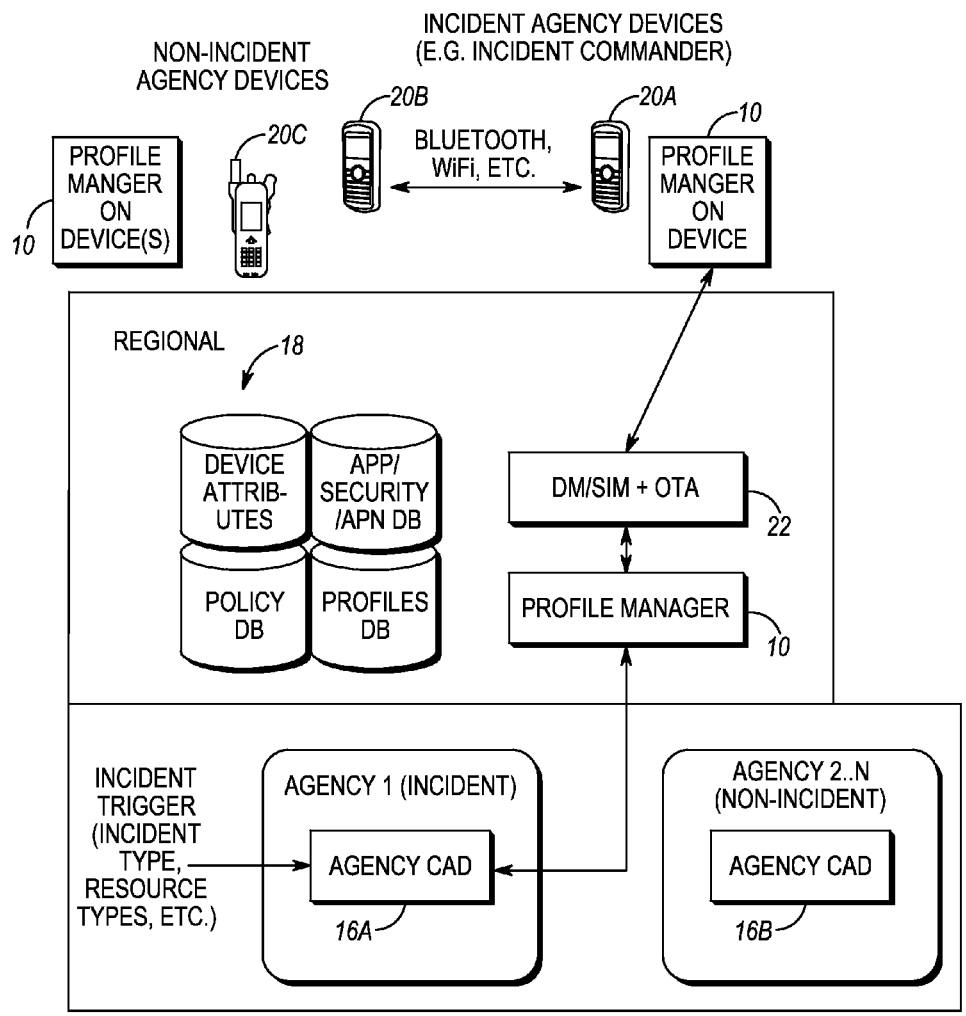
FIG. 8 is a block diagram of the profile manager of FIG. 1 for device initiated subscriber profile assignments or updates in accordance with some embodiments.
Figure 9:
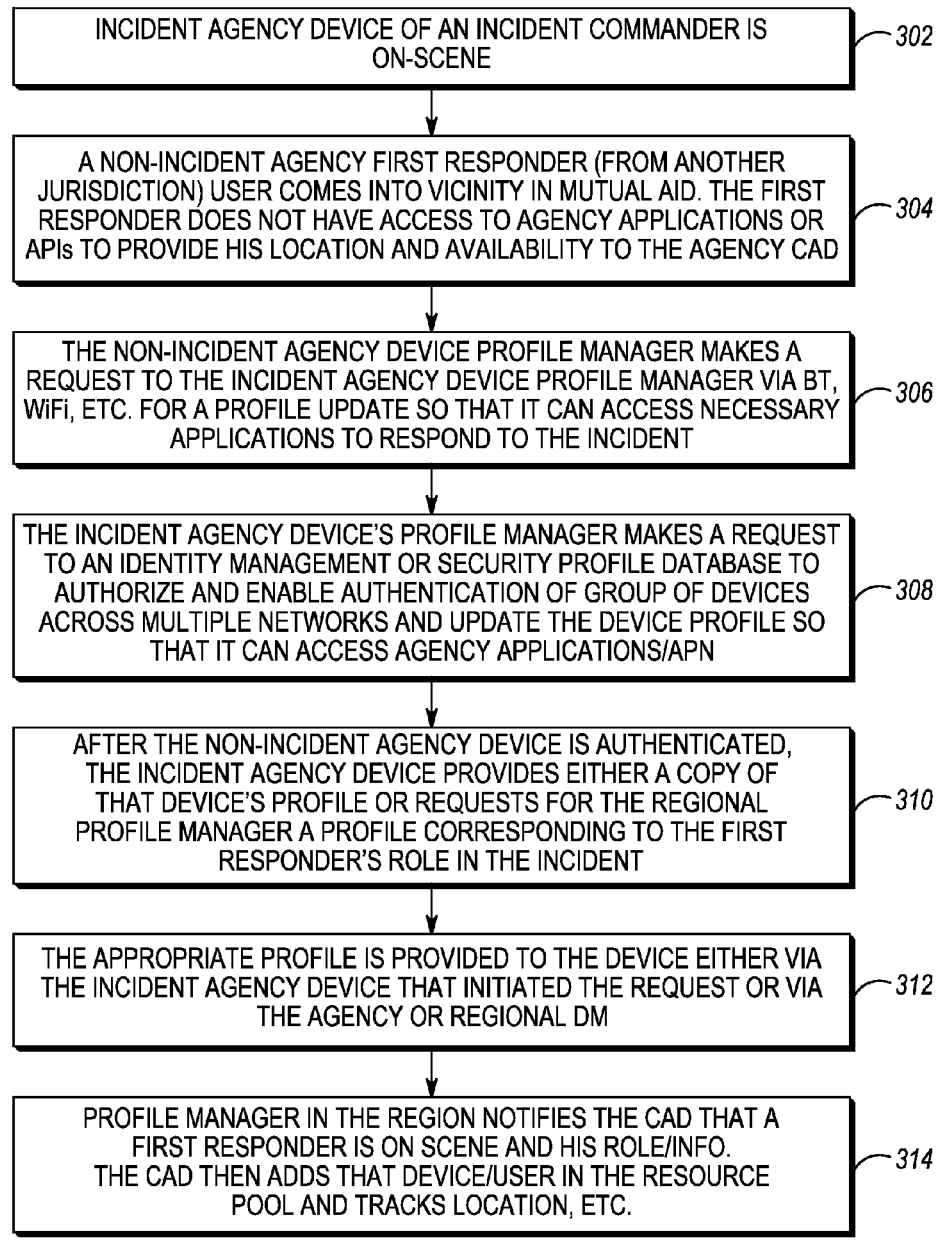
FIG. 9 is a flowchart of a device profile process in accordance with some embodiments.

FIGS. 8 and 9 are a block diagram (FIG. 8) of the profile manager 10 in accordance with another embodiment and a flowchart (FIG. 9) of a device profile process 300 executed by the profile manager 10 of FIG. 8 in performing a device-initiated subscriber profile assignment or update for mobile devices 20. In FIG. 8, the profile manager 10 is configured similarly as in FIGS. 1, 4, and 6, and further includes a connection to an incident agency device 20A, such as with an incident commander, and to new agency devices and/or non-incident agency devices 20B, 20C. All of the devices 20A, 20B, 20C can include a profile manager 10 operating thereon. That is, a full or partial profile manager 10 may reside on each device 20A, 20B, 20C in the vicinity of the incident and provide interactions to enable the devices 20A, 20B, 20C to get their profiles updated. A second instance may be available in the region.

A first responder can be responding to an incident and may have already traveled to the jurisdiction of the incident agency, that is, where the incident is located. The first responder's device may not have access to the local (incident) agency's applications, but an incident commander can authorize the first responder's device so that it can receive a profile update from a local device manager, or such that a full set, or a subset, of the incident commander's profile can be shared and used by the first responder. Once the profile is updated on the first responder's device (also referred to as a 'mutual aid device'), a profile manager 10 in the region reports to the incident agency's CAD, that is, CAD 16A, that the mutual aid device is available and the CAD can track it.

In FIG. 9, the device profile process 300 is illustrated. First, an incident agency device 20A of an incident commander is on-scene at an incident (step 302). A non-incident agency first responder (i.e., a first responder from another jurisdiction) comes into the vicinity of the incident to provide mutual aid. The first responder does not have access to applications of the incident agency or Application Programming Interfaces (APIs) of the incident agency in order to provide his location and availability to the incident agency CAD 16A (step 304). A new agency device and/or non-incident agency device 20C profile manager 10 makes a request to the profile manager 10 of the incident agency device 20A, for example, via a short range wireless protocol, such as Bluetooth (BT), Wi-Fi, etc., for a profile update so that the device 20C can access necessary applications to respond to the incident (step 306). The profile manager 10 of the incident agency device 20A makes a request to an identity management or the security profile database of the incident agency to authorize and enable authentication of device 20C or a group of devices that includes device 20C across multiple networks and to update the device profile(s) of these device(s) so that it/they can access applications/APNs of the incident agency (step 308).

After the new agency device and/or non-incident agency device 20C is authenticated, the incident agency device 20A provides either a copy of device 20A's profile or requests that the regional profile manager 10 provide a profile corresponding to the first responder's (utilizing device 20C) role in the incident (step 310). The profile manager 10 provides the appropriate profile to the device 20C either via the incident agency device 20A that initiated the request or via an agency or regional DM (step 312). The profile manager 10 in the region then notifies the incident agency CAD 16A that a first responder is on scene and of his or her role and related information. The incident agency CAD 16A then adds that user/device to a resource pool and tracks the device's location, etc. (step 314).

Figure 10:
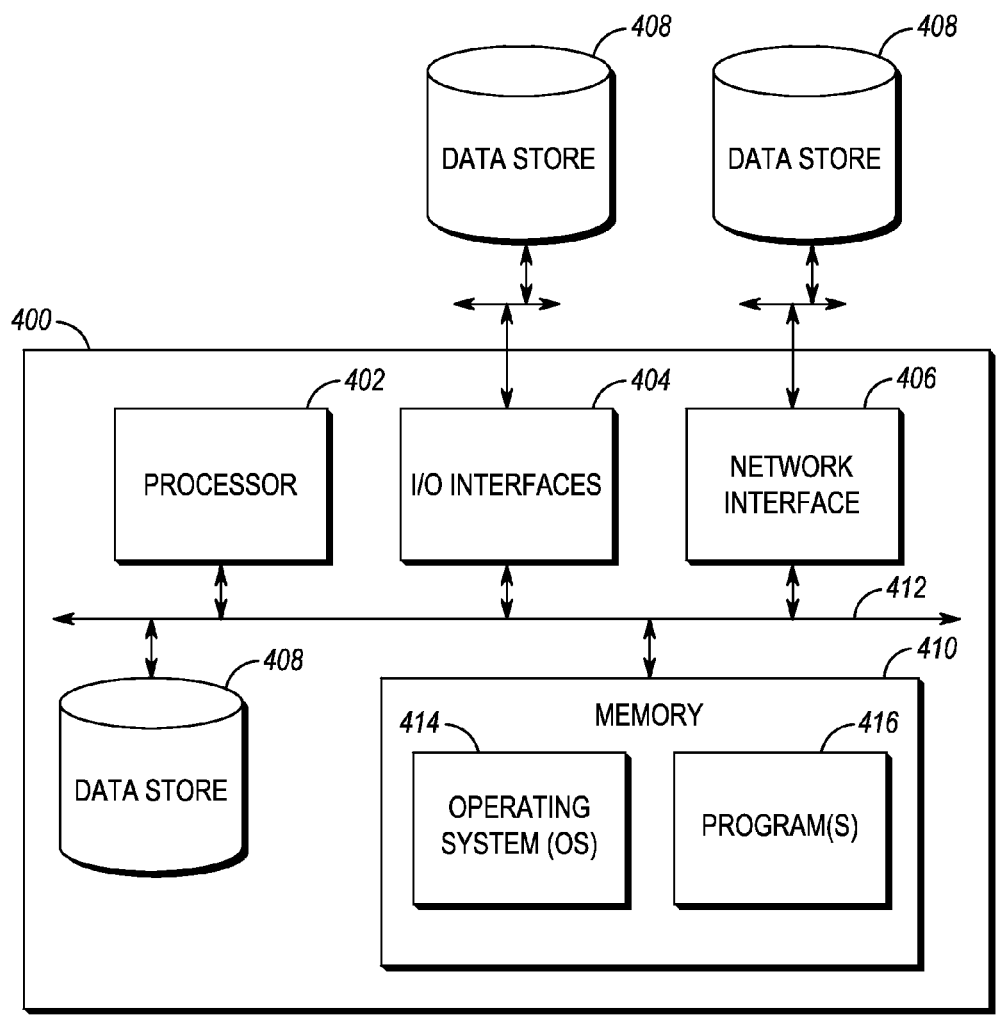
FIG. 10 is a block diagram of an exemplary implementation of a server for use in FIGS. 1-9 in accordance with some embodiments.

FIG. 10 is a block diagram of an exemplary implementation of a server 400, which server can implement the various processes described herein related to the profile manager 10. In an exemplary embodiment, the profile manager 10 can be implemented in one or more of the servers 400. The server 400 may be a digital computer that, in terms of hardware architecture, generally includes a processor 402, input/output (I/O) interfaces 404, a network interface 406, a data store 408, and memory 410. It should be appreciated by those of ordinary skill in the art that FIG. 10 depicts the server 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 may be, for example, but not limited to, one or more buses or other wired or wireless connections, as is known in the art. The local interface 412 may have additional elements, which are omitted for simplicity, such as controllers, buffers (caches), drivers, repeaters, and receivers, among many others, to enable communications. Further, the local interface 412 may include address, control, and/or data connections to enable appropriate communications between the aforementioned components.

The processor 402 is a hardware device for executing software instructions. The processor 402 may be any custom made or commercially available processor, a central processing unit (CPU), an auxiliary processor among several processors associated with the server 400, a semiconductor-based microprocessor (in the form of a microchip or chip set), or generally any device for executing software instructions. When the server 400 is in operation, the processor 402 is configured to execute software stored within the memory 410, to communicate data to and from the memory 410, and to generally control operations of the server 400 pursuant to the software instructions. The I/O interfaces 404 may be used to receive user input from and/or for providing system output to one or more devices or components. User input may be provided via, for example, a keyboard, touch pad, and/or a mouse. System output may be provided via a display device and a printer (not shown). I/O interfaces 404 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 406 may be used to enable the server 400 to communicate on a network, such as the Internet, a wide area network (WAN), a local area network (LAN), and the like, etc. The network interface 406 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 406 may include address, control, and/or data connections to enable appropriate communications for the server 400 to operate as the profile manager 10. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media. In one example, the data store 408 may be located internal to the server 400 such as, for example, an internal hard drive connected to the local interface 412 in the server 400. Additionally in another embodiment, the data store 408 may be located external to the server 400 such as, for example, an external hard drive connected to the I/O interfaces 404 (e.g., SCSI or USB connection). In a further embodiment, the data store 408 may be connected to the server 400 through a network, such as, for example, a network attached file server.

The memory 410 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 may include one or more software programs, each of which includes an ordered listing of executable instructions for implementing logical functions. The software in the memory 410 includes a suitable operating system (OS) 414 and one or more programs 416. The operating system 414 essentially controls the execution of other computer programs, such as the one or more programs 416, and provides scheduling, input-output control, file and data management, memory management, and communication control and related services. The one or more programs 416 may be configured to implement the various processes, algorithms, methods, techniques, etc. described herein, including those server 400 steps described in FIGS. 1-9 with respect to the profile manager 10.

In an exemplary embodiment, the server 400 can operate as the profile manager 10 for managing user and device profiles for response to one or more incidents, and the profile manager comprises: a network interface communicatively coupled to one or more networks; a processor communicatively coupled to the network interface; and memory storing computer executable instructions, and in response to execution by the processor, the computer executable instructions cause the processor to: monitor inputs related to the one or more networks, a plurality of devices, and the one or more incidents; determine application requirements and profile configurations for the plurality of devices based on the inputs from the one or more networks and the one or more incidents; and for each of the plurality of devices, provide applications based on the application requirements if required and provide the profile configurations for operation on the one or more networks during the one or more incidents.

The computer executable instructions can further cause the processor to: continually monitor the inputs, determine the application requirements and the profile configurations, and update the plurality of devices based thereon during the one or more incidents; and cause the plurality of devices to return to original profile configurations after the one or more incidents. The plurality of devices can include incident agency devices and non-incident agency devices, and wherein the application requirements and the profile configurations provide compatibility between the incident agency devices and the non-incident agency devices. The inputs can be received from a Computer Aided Dispatch (CAD) system of an incident agency associated with the one or more incidents. The plurality of devices can include incident agency devices and non-incident agency devices, and wherein the inputs related to the non-incident agency devices are provided from a CAD system of the non-incident agency.

The plurality of devices can include any of incident agency devices, non-incident agency devices, regional/national devices, and bring-your-own-device, and wherein the application requirements and the profile configurations provide compatibility and security between the plurality devices across operating systems and the applications. The network interface can be communicatively coupled to the one or more networks and to the plurality of devices via over-the-air interfaces.

Figure 11:
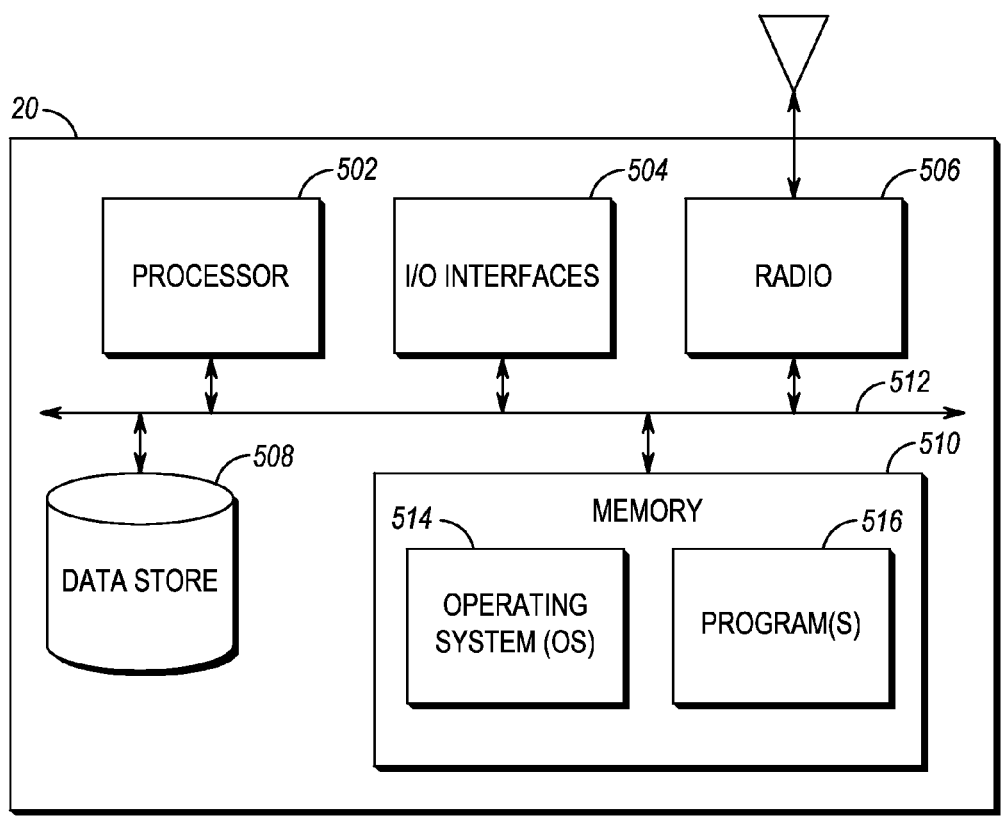
FIG. 11 is a block diagram of an exemplary implementation of a mobile device for use in FIGS. 1-9 in accordance with some embodiments.

FIG. 11 is a block diagram of a mobile device 20, which may be used in the method and apparatus or the like, in accordance with some embodiments. For example, the mobile device 20 can include, without limitation, a smart phone, a radio, a tablet, a vehicle modem, etc. The mobile device 20 can be a digital device that, in terms of hardware architecture, generally includes a processor 502, input/output (I/O) interfaces 504, one or more radios 506, a data store 508, and memory 510. It should be appreciated by those of ordinary skill in the art that FIG. 11 depicts the memory 510 in an oversimplified manner, and a practical embodiment may include additional components and suitably configured processing logic to support known or conventional operating features that are not described in detail herein. The components (502, 504, 506, 508, and 510) are communicatively coupled via a local interface 512. The local interface 512 can be, for example but not limited to, one or more buses or other wired or wireless connections, as is known in the art. The local interface 512 can have additional elements, which are omitted for simplicity, such as controllers, buffers (caches), drivers, repeaters, and receivers, among many others, to enable communications. Further, the local interface 512 may include address, control, and/or data connections to enable appropriate communications among the aforementioned components.

The processor 502 is a hardware device for executing software instructions. The processor 502 can be any custom made or commercially available processor, a central processing unit (CPU), an auxiliary processor among several processors associated with the memory 510, a semiconductor-based microprocessor (in the form of a microchip or chip set), or generally any device for executing software instructions. When the mobile device 20 is in operation, the processor 502 is configured to execute software stored within the memory 510, to communicate data to and from the memory 510, and to generally control operations of the mobile device 20 pursuant to the software instructions. In an exemplary embodiment, the processor 502 may include a mobile optimized processor such as optimized for power consumption and mobile applications. The I/O interfaces 504 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 504 can also include, for example, a serial port, a parallel port, a small computer system interface (SCSI), an infrared (IR) interface, a radio frequency (RF) interface, a universal serial bus (USB) interface, and the like. The I/O interfaces 504 can include a graphical user interface (GUI) that enables a user to interact with the memory 510.

The one or more radios 506 enables wireless communication to an external access device or network. Any number of suitable wireless data communication protocols, techniques, or methodologies can be supported by the radio 506, including, without limitation: RF; IrDA (infrared); Bluetooth; Zig-Bee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3 G/4 G, etc.); proprietary wireless data communication protocols such as variants of Wireless USB; and any other protocols for wireless communication. The data store 508 may be used to store data. The data store 508 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 508 may incorporate electronic, magnetic, optical, and/or other types of storage media.

The memory 510 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 510 may incorporate electronic, magnetic, optical, and/or other types of storage media. Note that the memory 510 may have a distributed architecture, where various components are situated remotely from one another, but can be accessed by the processor 502. The software in memory 510 can include one or more software programs, each of which includes an ordered listing of executable instructions for implementing logical functions. In the example of FIG. 11, the software in the memory 510 includes a suitable operating system (OS) 514 and programs 516. The operating system 514 essentially controls the execution of other computer programs, and provides scheduling, input-output control, file and data management, memory management, and communication control and related services. The programs 516 may include various applications, add-ons, etc. configured to provide end user functionality with the mobile device 20, including those mobile device functions set forth in FIGS. 1-9.

The profile manager 10 and the associated functionality can be realized through the server 400, the mobile devices 20, and/or a combination thereof. That is, the profile manager 10 can be centralized through the server 400, distributed operating on the mobile devices 20, or a combination of both. In an exemplary embodiment, the profile manager 10 operating on the mobile devices 20 can be limited to sub-functionality of the full functionality profile manager 10, which may operate on the server 400. The profile manager 10 can notify the CAD 16 that a new device has been added to the incident.

The profile manager 10 can have various interfaces such as an interface API to identity management function in order to update profiles on a user basis independent of the user's device, and interface API to trigger the assignment or update of the user profile utilizing an existing DM, CAD, or emergency application, and the like. The profile manager 10 is configured to perform application and security compatibility across all users in incident groups (e.g., application to application, and OS) and dynamically select the application type and version used for the incident(s) based on the results of the compatibility check to maximize interoperability across the group.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for managing devices for responding to an incident, the method comprising:
    monitoring, by a profile manager device, inputs related to availability and/or loading of one or more networks for use in responding to the incident, inputs related to a status of each of a plurality of devices for responding to the incident, and inputs related to the incident;
    determining, by the profile manager device for the plurality of devices for responding to the incident and based on the inputs, (i) application requirements identifying a set of applications for execution by the plurality of devices in responding to the incident and (ii) device configuration profiles setting forth parameters for the plurality of devices to operate on the one or more networks during the incident; and
    for each of the plurality of devices, causing, by the profile manager device, applications to be provided to the plurality of devices based on the determined application requirements and providing, by the profile manager device, the device configuration profiles to the plurality of devices.

2. The method of claim 1, further comprising:
    causing the plurality of devices to return to an original application set and device configuration profile after the incident.

3. The method of claim 1, wherein the profile manger device further determines device network assignments among a plurality of available networks based on available network bandwidth and the application requirements.

4. The method of claim 1, wherein the inputs are received from a Computer Aided Dispatch system of an incident agency associated with the incident.

5. The method of claim 1, wherein the plurality of devices comprise incident agency devices and non-incident agency devices, and wherein the inputs related to the non-incident agency devices are provided from Computer Aided Dispatch system of the non-incident agency.

6. The method of claim 1, wherein the plurality of devices comprise any of incident agency devices, non-incident agency devices, regional/national devices, and bring-your-own-device, and wherein the application requirements and the device configuration profiles provide compatibility and security between the plurality devices operating on the one or more networks.

7. The method of claim 1, wherein the device configuration profiles set forth one or more of group, user list, security, codec, and group scan parameters for operating on the one or more networks.

8. The method of claim 1, wherein the application requirements identify two or more required applications, for use in responding to the incident, selected from the list consisting of streaming video, mapping or locationing, push-to-talk (PTT), secure PTT, computer aided dispatch (CAD), video conferencing, voice over LTE, and white boarding.

9. The method of claim 1, wherein the inputs related to the status of each of the plurality of devices for responding to the incident include a list of applications currently available at each device.

10. The method of claim 1, wherein the inputs related to the incident include a severity of the incident, and wherein determining the application requirements based on the inputs comprises identifying one of a plurality of incident tiers based on the severity of the incident, wherein as the severity of the incident increases each corresponding incident tier requires a larger number of applications in the set of applications for responding to the incident.

11. A profile manager device for managing user and device profiles for response to an incident, the profile manager comprises:
    a network interface communicatively coupled to one or more networks;
    a processor communicatively coupled to the network interface; and
    memory storing computer executable instructions that, in response to execution by the processor, cause the processor to:
        monitor inputs related to availability and/or loading of the one or more networks for use in responding to the incident, inputs related to a status of each of a plurality of devices for responding to the incident, and inputs related to the incident;
        determine, for the plurality of devices for responding to the incident and based on the inputs, (i) application requirements identifying a set of applications for execution by the plurality of devices in responding to the incident and (ii) device configuration profiles setting forth parameters for the plurality of devices to operate on the one or more networks during the incident; and
        for each of the plurality of devices, cause applications to be provided to the plurality of devices based on the determined application requirements and provide the device configuration profiles to the plurality of devices.

12. The profile manager device of claim 11, wherein the computer executable instructions further cause the processor to:
    cause the plurality of devices to return to an original application set and device configuration profile after the incident.

13. The profile manager device of claim 11, wherein the computer executable instructions further cause the processor to determine device network assignments among a plurality of available networks based on available network bandwidth and the application requirements.

14. The profile manager device of claim 11, wherein the inputs are received from a Computer Aided Dispatch system of an incident agency associated with the incident.

15. The profile manager device of claim 11, wherein the plurality of devices comprise any of incident agency devices, non-incident agency devices, regional/national devices, and bring-your-own-device, and wherein the application requirements and the device configuration profiles provide compatibility and security between the plurality devices operating on the one or more networks.

16. The profile manager device of claim 11, wherein the device configuration profiles set forth one or more of group, user list, security, codec, and group scan parameters for operating on the one or more networks.

17. The profile manager device of claim 11, wherein the application requirements identify two or more required applications, for use in responding to the incident, selected from the list consisting of streaming video, mapping or locationing, push-to-talk (PTT), secure PTT, computer aided dispatch (CAD), video conferencing, voice over LTE, and white boarding.

18. The profile manager device of claim 11, wherein the inputs related to the status of each of the plurality of devices for responding to the incident include a list of applications currently available at each device.

19. The profile manager device of claim 11, wherein the inputs related to the incident include a severity of the incident, and wherein determining the application requirements based on the inputs comprises identifying one of a plurality of available incident tiers based on the severity of the incident, wherein as the severity of the incident increases each corresponding incident tier requires a larger number of applications in the set of applications for responding to the incident.

* * * * *